US012503303B2

(12) United States Patent
Liu et al.

(10) Patent No.: US 12,503,303 B2
(45) Date of Patent: Dec. 23, 2025

(54) CONTAINER PICK-AND-PLACE METHOD, COMPUTING APPARATUS AND COMPUTER-READABLE STORAGE MEDIUM

(71) Applicant: BEIJING GEEKPLUS TECHNOLOGY CO., LTD., Beijing (CN)

(72) Inventors: Haiyang Liu, Beijing (CN); Zhihui Qin, Beijing (CN); Zewei Li, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 19/188,218

(22) Filed: Apr. 24, 2025

(65) Prior Publication Data
US 2025/0250108 A1    Aug. 7, 2025

Related U.S. Application Data

(63) Continuation of application No. PCT/CN2023/126562, filed on Oct. 25, 2023.

(30) Foreign Application Priority Data

Oct. 28, 2022 (CN) ......................... 202222869703.0
Oct. 10, 2023 (CN) ......................... 202311310750.4
(Continued)

(51) Int. Cl.
*G06F 7/00* (2006.01)
*B65G 1/04* (2006.01)
*B66F 9/075* (2006.01)

(52) U.S. Cl.
CPC .......... *B65G 1/0435* (2013.01); *B66F 9/0755* (2013.01)

(58) Field of Classification Search
CPC ....... B65G 1/0435; B65G 1/00; B66F 9/0755; G06Q 10/08
(Continued)

(56) References Cited

U.S. PATENT DOCUMENTS

2020/0298404 A1    9/2020 Theobald
2022/0274775 A1    9/2022 Zhan

FOREIGN PATENT DOCUMENTS

CN    110654760    1/2020
CN    111605958    9/2020
(Continued)

OTHER PUBLICATIONS

CNIPA, First Office Action for CN Application No. 202311310757.6, Nov. 7, 2024.
(Continued)

*Primary Examiner* — Yolanda R Cumbess
(74) *Attorney, Agent, or Firm* — Hodgson Russ LLP

(57) ABSTRACT

The transfer robot includes: a chassis assembly, a lifting device arranged on the chassis assembly, and a pick-and-place assembly arranged on the lifting device. The lifting device is configured to drive the lifting of the pick-and-place assembly. The auxiliary support device is connected to the pick-and-place assembly and includes a driving assembly, a transmission assembly, and a support assembly. The driving assembly is connected to the support assembly by the transmission assembly to drive the support assembly to extend in a first direction relative to the pick-and-place assembly until the support assembly abuts against or separates from carriers at two sides of the transfer robot. The auxiliary support device is arranged on the pick-and-place
(Continued)

assembly and is configured to extend to a position abutting against the carriers to support the transfer robot in the process of picking up and placing a container.

20 Claims, 15 Drawing Sheets

(30) Foreign Application Priority Data

Oct. 10, 2023 (CN) .......................... 202311310757.6
Oct. 10, 2023 (CN) .......................... 202322722514.5

(58) Field of Classification Search
USPC ................................................. 700/213–216
See application file for complete search history.

(56) References Cited

FOREIGN PATENT DOCUMENTS

| | | | | |
|---|---|---|---|---|
| CN | 111620024 | 9/2020 | | |
| CN | 111824668 | 10/2020 | | |
| CN | 112208995 | 1/2021 | | |
| CN | 212711036 | 3/2021 | | |
| CN | 214454059 | 10/2021 | | |
| CN | 215477508 | 1/2022 | | |
| CN | 215711504 | 2/2022 | | |
| CN | 216154654 | 4/2022 | | |
| CN | 114476483 | 5/2022 | | |
| CN | 216996066 | 7/2022 | | |
| CN | 217229361 | 8/2022 | | |
| CN | 217497375 | 9/2022 | | |
| CN | 217577161 | 10/2022 | | |
| CN | 218578677 | 3/2023 | | |
| CN | 220843994 | 4/2024 | | |
| CN | 119142692 A | * 12/2024 | ........... | B65G 1/1373 |
| DE | 29515627 | 12/1995 | | |
| DE | 202012104254 | 2/2014 | | |
| EP | 2284877 | 2/2011 | | |
| TW | 1752767 | 1/2022 | | |
| TW | 202229138 | 8/2022 | | |
| WO | 2014072265 | 5/2014 | | |
| WO | 2023071399 | 5/2023 | | |
| WO | 2023071823 | 5/2023 | | |

OTHER PUBLICATIONS

CNIPA, Notification to Grant Patent Right for Invention for CN Application No. 202311310757.6, Dec. 24, 2024.
WIPO, International Search Report and Written Opinion for PCT/CN2023/126562, Jan. 25, 2024.
TIPO, Office Action for TW Application No. 112141420, Mar. 20, 2025.
CNIPA, First Office Action for CN Application No. 202311310750.4, Sep. 22, 2025.

* cited by examiner

Taking out the bin

Returning the bin

CONTAINER PICK-AND-PLACE METHOD, COMPUTING APPARATUS AND COMPUTER-READABLE STORAGE MEDIUM

CROSS-REFERENCE TO RELATED APPLICATIONS

The present application is a continuation of International Patent Application No. PCT/CN2023/126562, filed on Oct. 25, 2023, which claims priority of Chinese Patent Application No. 202222869703.0, filed on Oct. 28, 2022, Chinese Patent Application No. 202322722514.5, filed on Oct. 10, 2023, Chinese Patent Application No. 202311310750.4, filed on Oct. 10, 2023, and Chinese Patent Application No. 202311310757.6, filed on Oct. 10, 2023. The entire disclosures of the above-identified applications are hereby incorporated herein by reference.

FIELD

The present application relates to the technical field of warehousing and logistics, in particular to a container pick-and-place method, a computing apparatus and a computer-readable storage medium.

BACKGROUND

At present, a transfer robot with multi-stage gantry is usually used in the storage system to pick and place high-level containers.

SUMMARY

In order to solve the problems existing in the related art, the present disclosure provides a transfer robot and a container pick-and-place method.

A first aspect of the present disclosure provides a container pick-and-place method, which is applied to a transfer robot, wherein the transfer robot includes a pick-and-place mechanism, and the method includes: determining by the transfer robot a target container in response to a container pick-and-place instruction, and moving by the transfer robot to a target storage position corresponding to the target container; and controlling the pick-and-place mechanism to move to a first position, and starting to pick and place the target container in the first position, wherein the first position has a preset height difference with respect to the target storage position; and in a case that a current position is a preset position, adjusting the pick-and-place mechanism to a second position, and controlling the pick-and-place mechanism to pick and place the target container in the second position until completing picking and placing the container, wherein the second position has a target height difference with respect to the target storage position.

A second aspect of the present application provides a computing apparatus, including a memory, a processor and a computer instruction stored in the memory and executable on the processor, wherein when the processor executes the computer instruction, steps of a method according to the first aspect of the present disclosure are realized.

A third aspect of the present application provides a computer-readable storage medium, on which a computer instruction is stored, wherein when the computer instruction is executed by a processor, steps of the method according to the first aspect of the present disclosure are realized.

A beneficial effect of the present disclosure is that by arranging the auxiliary support device on the pick-and-place assembly and enabling the auxiliary support device to extend to a position abutting against the carrier, the transfer robot is supported in the process of picking and placing containers, and the stability of the robot is enhanced when picking and placing a container box.

DETAILED DESCRIPTION

Figure 1:
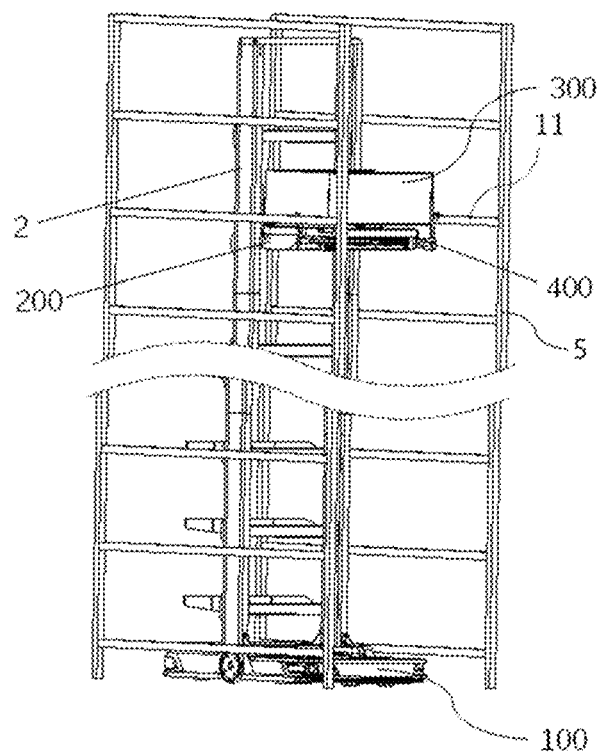
FIG. 1 is a schematic diagram where a transfer robot is fitted with a carrier according to some embodiments of the present disclosure.
Figure 2:
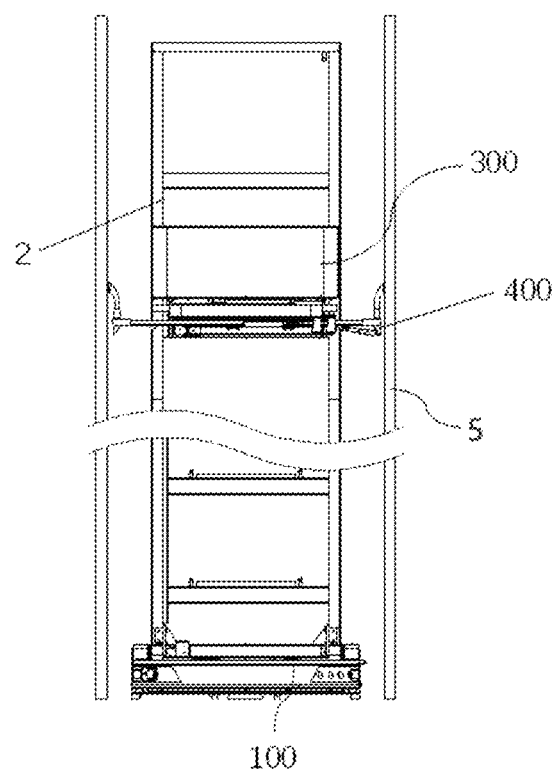
FIG. 2 is a schematic diagram from another perspective of FIG. 1.
Figure 3:
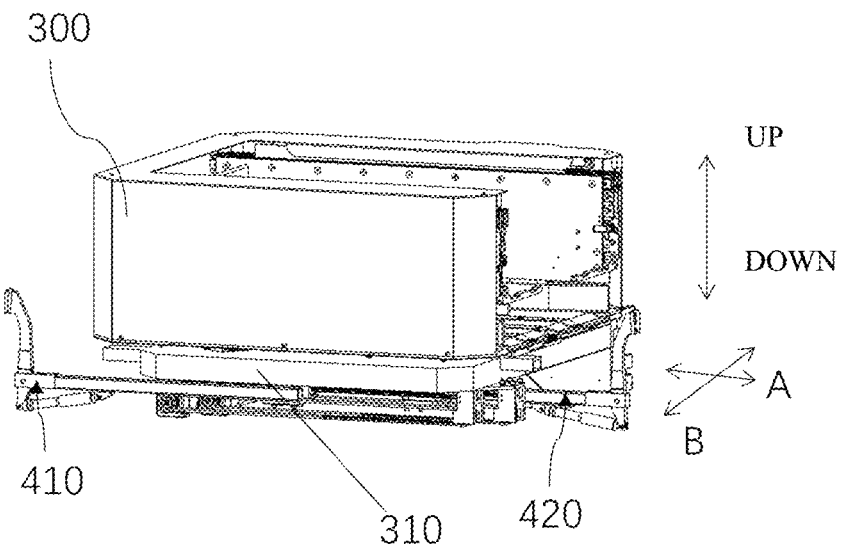
FIG. 3 shows an assembly schematic diagram of a pick-and-place assembly and an auxiliary support device in some embodiments of the present disclosure.
Figure 4:
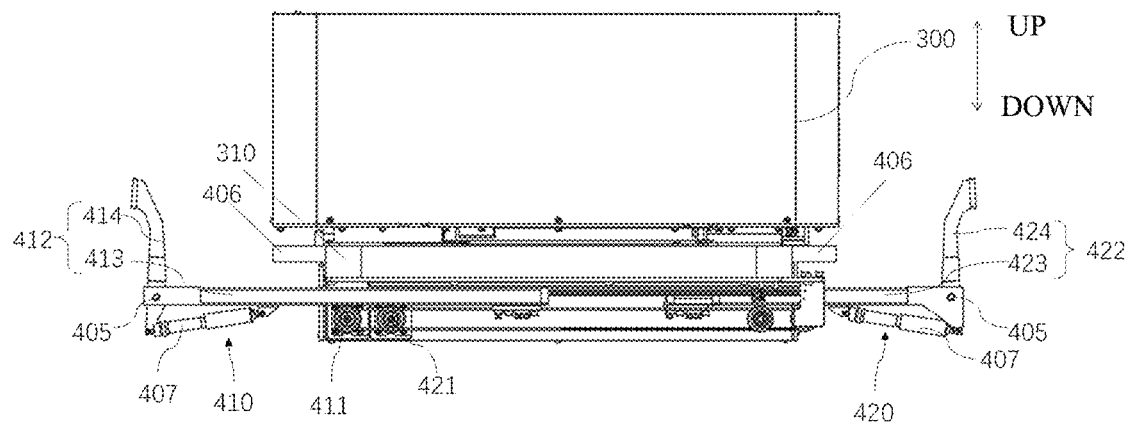
FIG. 4 is a schematic diagram from one perspective of FIG. 3.

Various exemplary embodiments of the present disclosure will now be described in detail with reference to the accompanying drawings. The relative arrangement, numerical expressions and numerical values of components and steps set forth in these embodiments do not limit the scope of the present disclosure unless otherwise specified.

The following description of at least one exemplary embodiment is merely illustrative and is in no way intended to limit the disclosure, its application or uses.

Techniques, methods and apparatus known to skills in the relevant fields may not be discussed in detail, but they should be regarded as part of the specification under appropriate circumstances.

In all examples shown and discussed herein, any specific values should be interpreted as illustrative only and not as a limitation. Therefore, other examples of exemplary embodiments may have different values.

Similar numbers and letters indicate similar items in the following drawings, so once an item is defined in one drawing, it does not need to be discussed in subsequent drawings.

In this disclosure, the words "up", "down", "front", "rear", "left" and "right" are only used to express the relative position relationship between related parts, but not to limit the absolute position of these related parts.

In this disclosure, "first" and "second" are only used to distinguish each other, instead of indicating the importance, order and the premise of mutual existence.

In this disclosure, "equal" and "same" are not strict mathematical and/or geometric limitations, but also contain differences that can be understood by those skilled in the art and allowed by manufacturing or use.

Unless otherwise specified, numerical ranges in this paper include not only the whole range within its two endpoints, but also several subranges contained therein.

With the rapid development of the logistics industry and the increasing cost of human resources, in order to improve the utilization efficiency of the warehouse and reduce the storage cost, more and more people choose to use an automated three-dimensional warehouse to solve the storage problem. At present, a transfer robot with multi-stage gantry is usually used in the storage system to pick and place high-level containers. When the transfer robot handles containers on the high-level shelf, the transfer robot is prone to shaking, which can lead to the failure of handling tasks.

The present disclosure provides a transfer robot, which can be used in the storage fields. By means of this transfer robot, a target container in a storage area can be transferred, for example, between different carriers, or between different storage positions of a same carrier, or between carriers and other positions. Of course, the transfer robot of the present disclosure can also be used in other application scenes, such as shopping malls, hotels, workshops and other scenes where handling and transferring items are needed, which will not be described in detail in the present disclosure.

The transfer robot of the present disclosure includes a chassis assembly, a lifting device, a pick-and-place assembly and an auxiliary support device. The chassis assembly is used to support other components of the transfer robot, and the transfer robot can travel on the ground through its chassis assembly. The lifting device is arranged on the chassis assembly, in an embodiment, the lifting device is configured to extend upward from the chassis assembly. The lifting device can include a gantry assembly, for example, can only include a first-stage gantry or a multi-stage gantry, and a movable gantry can be slidably connected to a fixed gantry to transport the pick-and-place assembly to a higher height. The pick-and-place assembly is arranged on the lifting device, and the lifting device can drive the pick-and-place assembly to ascend or descend. The pick-and-place assembly can move along the lifting device in the height direction of the transfer robot, so as to drive the pick-and-place assembly to different target heights and pick and place target containers at different heights.

The auxiliary support device is connected with the pick-and-place assembly, and includes a driving assembly, a transmission assembly and a support assembly, and the driving assembly is connected with the support assembly through the transmission assembly, so as to drive the support assembly to extend out in a first direction relative to the pick-and-place assembly until the support assembly abuts against or separates from carriers at two sides of the transfer robot. In the initial state, the auxiliary support device is separated from the carriers at two sides of the transfer robot, and at this time, the auxiliary support device does not play a supporting role. When support is needed, the auxiliary support device is configured to extend relative to the transfer robot until it abuts against the carriers located at two sides of the transfer robot, which is in an extended position. This is beneficial to keep the relative position between the pick-and-place assembly and the carrier stable, so as to achieve the purpose of improving the success rate of picking and placing target containers by the pick-and-place assembly.

Embodiment 1

As shown in FIGS. 1 to 7, according to an embodiment of the present disclosure, a transfer robot is provided, which includes a chassis assembly 100, a lifting device 200, a pick-and-place assembly 300 and an auxiliary support device 400. The lifting device 200 is arranged on the chassis assembly 100, and the pick-and-place assembly 300 is arranged on the lifting device 200, and the lifting device 200 can drive the pick-and-place assembly 300 to ascend or descend. The auxiliary support device 400 is connected to the pick-and-place assembly 300. The auxiliary support device 400 includes a driving assembly, a transmission assembly and a support assembly, and the driving assembly is connected with the support assembly through the transmission assembly, so as to drive the support assembly to extend out in the first direction A relative to the pick-and-place assembly 300 until the support assembly abuts against or separates from the carriers 5 at two sides of the transfer robot. The transmission assembly is arranged along the first direction A, and the driving assembly is arranged along a second direction B, and the first direction A is perpendicular to the second direction B.

The auxiliary support device 400 has an extended support state and a retracted storage state. In the extended support state, the auxiliary support device 400 extends in the first direction A relative to the transfer robot until the support assembly abuts against the carriers 5 at two sides of the transfer robot. In the retracted storage state, the support assembly of the auxiliary support device 400 is separated from the carriers 5.

The first direction A and the second direction B may be two mutually perpendicular horizontal directions perpendicular to the lifting direction (the up-down direction) of the pick-and-place assembly 300.

Carrier 5 refers to a device for storing containers in a storage system, which, in an embodiment, can be a shelf. The carrier 5 usually includes a support rod, a cross beams 11 and a layer plate, and the support rod is supported on the ground, the cross beam 11 is connected to the support rod, and a plurality of cross beams 11 are arranged at intervals in the vertical direction, and each cross beam 11 is provided with the layer plate, and the layer plate forms a storage layer of the carrier 5, and the storage layer is used for placing containers. In a storage system, there are generally a plurality of carriers 5, which are arranged in rows and columns, and a roadway is defined between each row and each column of carriers 5. The transfer robot travels in the roadway, and returns the container to the corresponding carrier 5 or takes the container out from the corresponding carrier 5 after traveling to a designated position.

When the container is picked and stored, the auxiliary support device 400 extends out until it abuts against the carriers 5 at two sides of the transfer robot, and when the container is picked and stored, the auxiliary support device 400 retracts and separates from the carriers 5.

The transfer robot in an embodiment improves the stability of the bin robot when picking and storing containers on high-level shelves, and does not affect the outline size and flexibility of the bin robot. The auxiliary support device 400 is connected to the pick-and-place assembly 300, so that when the pick-and-place assembly 300 ascends and descends, the auxiliary support device 400 ascends and descends synchronously, and when the pick-and-place assembly 300 ascends to a high place to pick and place the containers at the high place, the auxiliary support device 400 synchronously ascends to a high place. At this time, the auxiliary support device 400 is abutted with the carriers 5 (such as shelves) at two sides of the transfer robot, and the auxiliary support device 400 plays a assisting stabilizing role for the transfer robot, thus improving the stability of the transfer robot when picking and placing the containers on the high-level shelves. In addition, the transfer robot can access containers on the carriers 5 with different layers, and the auxiliary support device ascends and descends along with the telescopic fork, so that the height of the auxiliary support device can be adjusted and realize that when the bin robot picks and places containers at different heights, the auxiliary support device 400 can always be used, thus improving the stability of the bin robot when picking and placing containers at high heights. At the same time, the driving assembly and the transmission assembly are arranged in mutually perpendicular directions, so that the structure of the auxiliary support device is relatively compact, and the problem that the auxiliary support device occupies a large space in the same direction is avoided.

The chassis assembly 100 in an embodiment is the bearing base for carrying other assemblies (including the lifting device 200, the pick-and-place assembly 300, the auxiliary support device 400, etc.) of the transfer robot, which enables the robot to complete various movements such as travelling and turning on the ground. The chassis assembly 100 includes a chassis, a vibration damping assembly and a traveling driving assembly, wherein the traveling driving assembly includes a traveling motor, a traveling driving wheel and a traveling universal wheel, and two traveling driving wheels can be provided, and two or more traveling universal wheels can be provided. Among them, the traveling driving wheels can be arranged in the way of in the center line of front-rear direction with differential speeds at left and right sides, or in the way of in the center line of left-right direction with idler wheels at front and rear sides. The traveling universal wheel only plays a supporting role with a relatively random relative arrangement position, which can be directly placed under the chassis, or can form a wheel set hinged under the chassis.

The lifting device 200 includes a gantry assembly 2 and a lifting mechanism, wherein the gantry assembly 2 is vertically fixed on the chassis and can be composed of one, two or more columns. The gantry assembly 2 plays a guiding role in the vertical lifting of the lifting mechanism. The lifting mechanism is a component that can move in the vertical direction and is arranged above the gantry assembly 2. There are many ways to realize the lifting mechanism, such as the way that a motor cooperates with a drive belt assembly or a motor cooperates with a chain assembly. The lifting mechanism is used to carry the pick-and-place assembly 300 and the container to move up and down. The end of the lifting mechanism can be connected to a mounting seat, and the base 310 of the pick-and-place assembly 300 is arranged on the mounting seat, and the mounting seat can move in the vertical direction under the action of the lifting mechanism, thus driving the pick-and-place assembly 300 to move in the vertical direction.

The pick-and-place assembly 300 is used to pick and place the containers. In an embodiment, the pick-and-place assembly 300 can return the containers on the transport robot to the carrier 5, or take out the containers on the carrier 5 to the transport robot. The container picked and placed by the pick-and-place assembly 300 can be a cargo box, a bin, a packing box or goods.

The pick-and-place assembly 300 includes a base 310, a telescopic fork assembly and a distance sensor. The telescopic fork assembly can be arranged on the base 310. The distance sensor is arranged on the telescopic fork assembly or the base 310, and includes an image acquisition apparatus for identifying the position of the container and an obstacle detection member for obstacle detection, etc. The image acquisition apparatus for identifying the container position can be a three-dimensional imaging module, which can locate the three-dimensional information of the container and calculate the distance between the container and the pick-and-place assembly 300, etc, and the obstacle detection member for obstacle detection can be an infrared sensor, etc. The telescopic fork assembly can extend out when the obstacle distance sensor detects that there is no obstacle on the telescopic path of the telescopic fork assembly, and quantitatively extend and retract to pick and place the container based on the detection information of the image acquisition apparatus. Generally, the telescopic direction of the telescopic fork assembly coincides with the telescopic direction of the auxiliary support device 400. The telescopic fork assembly can be a primary telescopic assembly or a multi-stage telescopic assembly, and the telescopic fork assembly can be a unidirectional telescopic assembly or a bidirectional telescopic assembly. In an embodiment, the telescopic fork assembly can adopt the existing conventional technology.

In order to avoid affecting picking and placing containers by the pick-and-place assembly 300, in one implementation, the auxiliary support device 400 is installed below the base 310 of the pick-and-place assembly 300.

The auxiliary support device 400 in an embodiment usually has the telescopic ability at two ends, so that the auxiliary support device 400 can abut against the carriers 5 at two sides of the transfer robot when the auxiliary support device is extended. The auxiliary support device 400 can be a way that one driving assembly drives two support assemblies to extend and retract relatively, or a way that two driving assemblies respectively drive two support assemblies to extend and retract relatively.

In one implementation, referring to FIGS. 3 to 7, the driving assembly of the auxiliary support device 400 includes a first driving assembly 411 and a second driving assembly 421, the transmission assembly includes a first transmission assembly 416 and a second transmission assembly, and the support assembly includes a first support assembly 412 and a second support assembly 422. The first driving assembly 411, the first transmission assembly 416 and the first support assembly 412 constitute the first support mechanism 410, and the first driving assembly 411 is connected with the first support assembly 412 through the first transmission assembly 416, and is used for driving the first support assembly 412 to extend and retract in the first direction A. The second driving assembly 421, the second transmission assembly and the second support assembly 422 constitute a second support mechanism 420, and the second driving assembly 421 is connected with the second support assembly 422 through the second transmission assembly, and is used for driving the second support assembly 422 to extend and retract in the first direction A. The first support assembly 412 and the second support assembly 422 are respectively arranged at two opposite ends of the pick-and-place assembly 300, and the first support assembly 412 and the second support assembly 422 are respectively used for abutting against the carriers 5 at two sides of the transfer robot.

The first support mechanism 410 and the second support mechanism 420 are independent driving structures, so that the extension amounts of the first support assembly 412 and the second support assembly 422 can be controlled respectively according to the actual distances between the transfer robot and the carriers 5 at two sides of the transfer robot.

Figure 5:
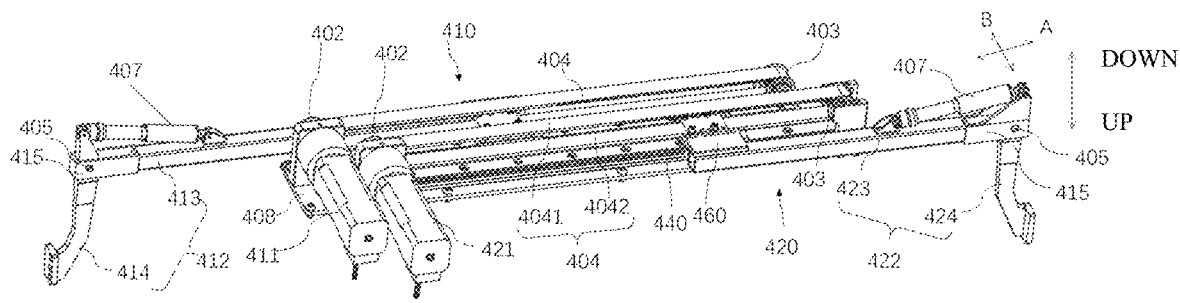
FIG. 5 is a schematic diagram of an auxiliary support device of some embodiments of the present disclosure from one perspective.
Figure 6:
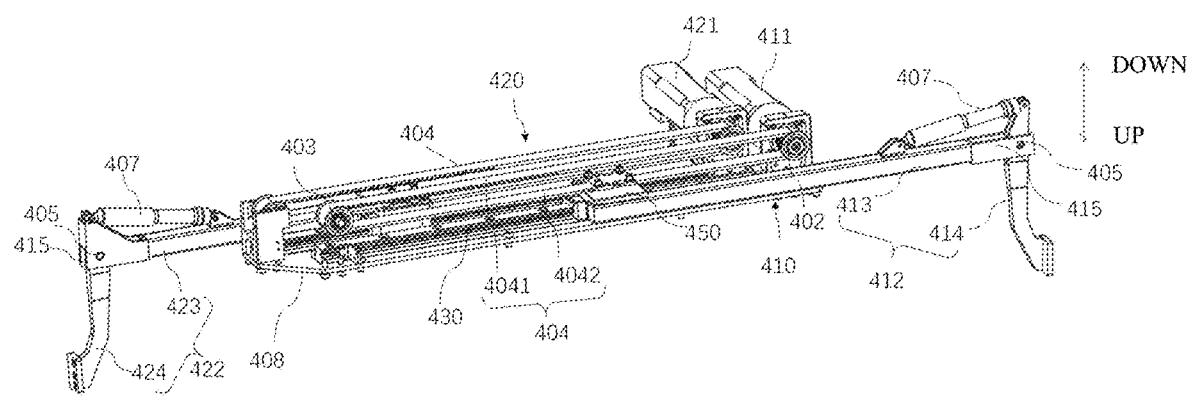
FIG. 6 is a schematic diagram from another perspective of FIG. 5.

The first drive assembly 411 and the second drive assembly 421 can be motors, and the first transmission assembly 416 and the second transmission assembly can be linear transmission piece s, and the motors are connected to the first support assembly 412 or the second support assembly 422 through the linear transmission pieces. Referring to FIGS. 5 and 6, both the first driving assembly 411 and the second driving assembly 421 are arranged along the second direction B, and the first driving assembly 411 and the second driving assembly 421 are arranged in sequence along the first direction A. Both the first transmission assembly 416 and the second transmission assembly are arranged along the first direction A, and are arranged in turn along the second direction B.

The linear transmission piece is a member that can realize the power transmission between the motor and the first support assembly 412 or the second support assembly 422, and can make the first support assembly 412 or the second support assembly 422 move in a straight line. The linear transmission piece can be a ball screw assembly, a rack and pinion assembly, etc. The transmission assemblies and driving assemblies of the first support mechanism 410 and the second support mechanism 420 are independently arranged. In an embodiment, the first driving assembly 411 is connected to a linear transmission piece forming the first transmission assembly, and the first transmission assembly is connected to the first support assembly 412. The second driving assembly 421 is connected with a linear transmission piece forming the second transmission assembly, and the second transmission assembly is connected with the second support assembly 422.

In an embodiment, referring to FIGS. 4 to 7, the first transmission assembly 416 and the second transmission assembly both include a driving wheel 402, a transmission wheel 403 and a traction transmission component 404, wherein the first driving assembly or second driving assembly, that is, the motor, is connected with the driving wheel 402, and the driving wheel 402 and the transmission wheel 403 are sequentially arranged at intervals along the first direction A, and the traction transmission component 404 is wound around the driving wheel 402 and the transmission wheel 403; The traction transmission component 404 includes a first part 4041 and a second part 4042, the first part 4041 and the second part 4042 are located between the driving wheel 402 and the transmission wheel 403, and are located at two ends of the driving wheel 402 in the radial direction of the driving wheel 402, and one of the first part 4041 and the second part 4042 is connected with the first support assembly 412 or the second support assembly 422.

The output shaft of the motor is connected with the driving wheel 402. When the driving wheel 402 rotates, the traction transmission component 404 rotates with the driving wheel 402. During the rotation of the traction transmission component 404, the movements of the first part 4041 and the second part 4042 are opposite. Referring to FIGS. 5 and 6, the axes of the driving wheel 402 and the transmission wheel 403 are parallel to each other and perpendicular to the first direction A (that is, parallel to the second direction B). The first part 4041 of the traction transmission component 404 is arranged below the driving wheel 402 and the transmission wheel 403, and the second part 4042 of the traction transmission component 404 is located above the driving wheel 402 and the transmission wheel 403. The second part 4042 of the traction transmission component 404 of the first driving assembly 411 is connected with the first support assembly 412, and the second part 4042 of the traction transmission component 404 of the second driving assembly 421 is connected with the second support assembly 422.

In an embodiment, both the driving wheel 402 and the transmission wheel 403 can be arranged on the base 310 of the pick-and-place assembly 300. In an embodiment, the driving wheel 402 and the transmission wheel 403 are fixed on the base 310 through a wheel seat, and the driving wheel 402 and the transmission wheel 403 retain their own freedom of rotation, that is, both the driving wheel 402 and the transmission wheel 403 can rotate around their own axes. The traction transmission component 404 of the first driving assembly 411 and the traction transmission component 404 of the second driving assembly 421 may be arranged in parallel along the second direction B. The second direction B is a direction perpendicular to the first direction A and the vertical direction.

The driving wheel 402 and the transmission wheel 403 can be pulleys, and the corresponding traction transmission components 404 are transmission belts, synchronous belts or chain ropes. The driving wheel 402 and the transmission wheel 403 can also be sprockets, and the corresponding traction transmission components 404 are chains.

In order to improve the stability of the first support assembly 412 and the second support assembly 422 during expansion and contraction, as shown in FIGS. 4 to 7, the auxiliary support device 400 in an embodiment includes a first guide rail 430 and a second guide rail 440, both of which extend along the first direction A. The first support assembly 412 is slidably arranged on the first guide rail 430 through the first slider 450, and the second support assembly 422 is slidably arranged on the second guide rail 440 through the second slider 460.

In an embodiment, the first guide rail 430 is arranged corresponding to the first support assembly 412 and the second guide rail 440 is arranged corresponding to the second support assembly 422, and the first guide rail 430 and the second guide rail 440 are arranged in parallel along the first direction A. The first support assembly 412 is fixedly connected with the first slider 450, and the first slider 450 is installed on the first guide rail 430, and retains the freedom of sliding along the extension direction of the first guide rail 430, that is, the first slider 450 cannot be disengaged from the first guide rail 430, and the first slider 450 can also slide along the first guide rail 430. The second support assembly 422 is fixedly connected with the second slider 460, and the second slider 460 is installed on the second guide rail 440, and retains the freedom of sliding along the extension direction of the second guide rail 440, that is, the second slider 460 cannot be disengaged from the second guide rail 440, and the second slider 460 can also slide along the second guide rail 440.

The first guide rail 430 and the second guide rail 440 can be directly arranged on the bottom surface of the base 310 of the pick-and-place assembly 300, or connected to a mounting plate 408 on the bottom surface of the base 310 of the pick-and-place assembly 300, and the first guide rail 430 and the second guide rail 440 are mounted on the mounting plate 408. When the mounting plate 408 is provided, as shown in FIGS. 5, 6 and 7, the driving wheel 402 and the transmission wheel 403 are mounted on the mounting plate 408 through wheel seats.

According to some embodiments of the present disclosure, in one implementation, the first support assembly 412 includes a first main body portion 413 and a first support portion 414, and the second support assembly 422 includes a second main body portion 423 and a second support portion 424, both of the first main body portion 413 and the second main body portion 423 extend in the first direction A, and the first support portion 414 is disposed at the first end of the first main body portion 413 and the second support portion 424 is disposed at the second end of the second main body portion 423, and the first end and the second end are opposite ends. The first main body portion 413 is connected with the first driving assembly 411, and the second main body portion 423 is connected with the second driving assembly 421. The first support portion 414 and the second support portion 424 are respectively used for abutting against the carriers 5 at two sides of the transfer robot.

Figure 7:
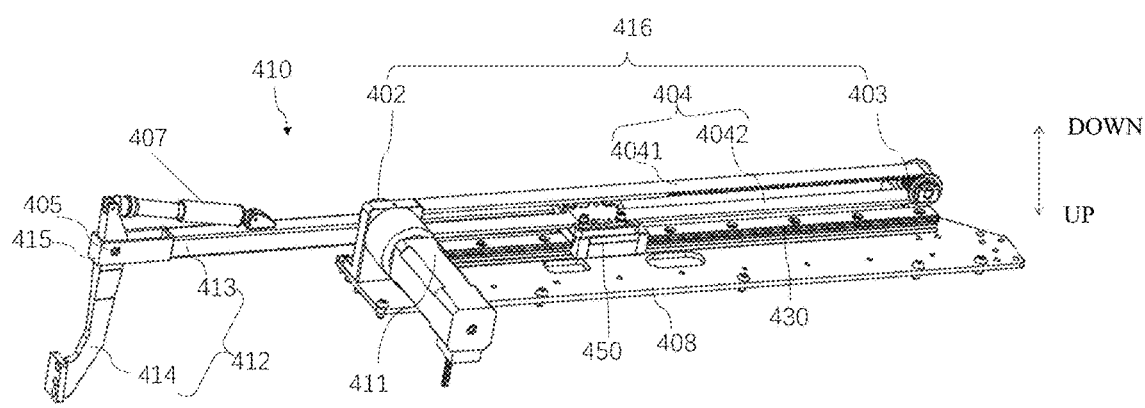
FIG. 7 is a partial schematic diagram of FIG. 5.

In an embodiment, referring to FIGS. 5 to 7, the second end of the first main body portion 413, that is, the end of the first main body portion 413 away from the first support portion 414, is connected with the traction transmission component 404 corresponding to the first driving assembly 411, and the second end of the first main body portion 413 is also connected with the first slider 450. One end of the second main body portion 423 away from the second support portion 424, that is, the first end of the second main body portion 423 is connected with the traction transmission component 404 corresponding to the second driving assembly 421, and the first end of the second main body portion 423 is also connected with the second slider. The second end of the first main body portion 413 can also be connected to the traction transmission component 404 through the first slider 450, and the first end of the second main body portion 423 can also be connected to the traction transmission component 404 through the second slider 460.

In an embodiment, the first support portion 414 is hinged with the first main body portion 413, and the first support portion 414 has a folded posture parallel to the first main body portion 413 and an unfolded posture perpendicular to the first main body portion 413. In an embodiment, the first support assembly 412 includes a third driving assembly, and the third driving assembly is arranged on the first main body portion 413 and connected with the first support portion 414, and is used to drive the first support portion 414 to rotate relative to the first main body portion 413, so as to make the first support portion 414 switch between the folded posture and the unfolded posture.

In an embodiment, the second support portion 424 is hinged with the second main body portion 423, and the second support portion 424 has a folded posture parallel to the second main body portion 423 and an unfolded posture perpendicular to the second main body portion 423. In an embodiment, the second support assembly 422 includes a fourth driving assembly, and the fourth driving assembly is arranged on the second main body portion 423 and connected with the second support portion 424. The fourth driving assembly is used to drive the second support portion 424 to rotate relative to the second main body portion 423, so as to make the second support portion 424 switch between the folded posture and the unfolded posture.

The arrangement between the first support portion 414 and the first main body portion 413 and the arrangement between the second support portion 424 and the second main body portion 423 may be the same. In the following, the first support mechanism 410, that is, the connection between the first support portion 414 and the first main body portion 413, will be described in detail.

When the first support portion 414 is in the unfolded posture, the first support portion 414 may extend along the second direction B, which is perpendicular to the first direction A and the vertical direction, or extend along the vertical direction. For example, the first support portion 414 is hinged with the first end hinged to the first main body portion 413 through the rotating shaft 405. When the axis of the rotating shaft 405 is set to extend along the second direction B, the first support portion 414 can rotate in a vertical plane, and at this time, the unfolded posture of the first support portion 414 is in a substantially vertical state. When the axis of the rotating shaft 405 is set to extend in the vertical direction, the first support portion 414 can rotate in the horizontal plane. At this time, the unfolded posture of the first support portion 414 is in a state of being arranged along the second direction B.

In one implementation, the two ends of the first support portion 414 can be arranged in the same plane, so that two ends of the first support portion 414 can abut against the carriers 5.

In an embodiment, as shown in FIGS. 4 to 7, one end of the first support portion 414 (which will be described later as a hinged end for convenience of description) is hinged to the first main body portion 413 through the rotating shaft 405 extending in the second direction B, and the other end of the second support portion 424 (which will be described later as an abutting end for convenience of description) can rotate in the vertical plane, and when in unfolded state, the abutting end of the second support portion 424 tilts upward and is used to abut against the carriers 5.

When in the unfolded posture, the perpendicularity between the first support portion 414 and the first main body portion 413 is not limited to being completely perpendicular, but may be approximately perpendicular; when in the folded posture, the parallelism between the first support portion 414 and the first main body portion 413 is not limited to being completely parallel, but may be approximately parallel.

The first support portion 414 can be switched between the unfolded posture and the folded posture, so that when the first support portion 414 is in the folded posture, it can be stored under the base 310 together with the first main body portion 413, so as to prevent the first support portion 414 from extending out and taking up space. When the auxiliary support device 400 needs to be used, the first support portion 414 is in the unfolded posture, which can better abut against the carriers 5, thus improving the stability of the auxiliary support device 400 abutting against the carriers 5.

The third driving assembly can be a linear driving piece, and the third driving assembly is hinged on the first main body portion 413, and the output end of the third driving assembly is hinged with one end of the first support portion 414. In an embodiment, the third driving assembly can be in the form of a cylinder, a hydraulic cylinder or an electric cylinder, and can also be an elastic driving piece 407. In an embodiment, in order to simplify the structure, the elastic driving piece 407 is used as the third driving assembly.

In an embodiment, the elastic driving piece 407 has a tendency to keep the first support portion 414 in the unfolded posture, that is, the elastic driving piece 407 can apply a force to the first support portion 414 to make the first support portion 414 in the unfolded posture. The elastic driving element 407 can be a compression spring member composed of a spring, or a gas spring.

In an embodiment, referring to FIG. 4 to FIG. 7, the first end of the first main body portion 413 is provided with a connecting seat 415, and a clamping groove is arranged on the connecting seat 415, and the clamping groove runs through from top to bottom, and a limiting structure is arranged in the clamping groove. The rotating shaft 405 is arranged at one end of the first support portion 414 near the hinge end, and the rotating shaft 405 is arranged on the side wall of the clamping groove; One end of the elastic driving piece 407 is connected with the lower end face of the first main body portion 413, and the other end of the elastic driving piece 407 is connected with the hinged end of the first support portion 414, and the elastic driving piece 407 connected with the first support portion 414 is located on the side of the first support portion 414 near the first end. The elastic driving piece 407 applies a pushing force to the hinged end of the first support portion 414, so that the abutting end of the first support portion 414 rotates around the rotating shaft 405 from the side of the first main body portion 413 away from the second end to be arranged in the vertical direction, and at this time, the first support portion 414 is in an unfolded posture; When the first support portion 414 is in the unfolded posture, the elastic driving piece 407 still exerts a pushing force on the hinged end of the first support portion 414, and the corresponding limiting structure is arranged on the clamping groove, so that the first support portion 414 cannot continue to rotate even being pushed by the pushing force when the first support portion 414 is in the unfolded posture, so that the first support portion 414 can maintain the unfolded posture under the action of the limiting structure and the elastic driving piece 407.

The structure of the second support mechanism 420 and the structure of the first support mechanism 410 can adopt the same structure, and the fourth driving assembly and the third driving assembly can adopt the same structure. For details, please refer to the above detailed description of the first support mechanism 410, which will not be repeated here. The nouns of locality such as above and below in an embodiment are described with reference to the use state of the transfer robot, that is, with reference to the state when the auxiliary support device 400 is arranged on the transfer robot. FIGS. 5 and 6 show the auxiliary support device 400 upside down.

In an embodiment, the first support portion 414 and the second support portion 424 maintain their unfolded postures by using the elastic driving piece 407, so that the contact between the first support portion 414 and the second support portion 424 and the carriers 5 is non-rigid, which has a certain buffering effect and prevents the first support portion 414 and the second support portion 424 from damaging the carriers 5.

In order to conveniently reset the first support portion 414 to the folded posture when using the elastic driving piece 407, two ends of the pick-and-place assembly 300 in an embodiment corresponding to the first support portion 414 and the second support portion 424 is provided with stop-reset pieces 406. When the first support assembly 412 and the second support assembly 422 are retracted, the stop-reset pieces 406 act on the corresponding first support portion 414 or second support portion 424, so that the first support portion 414 and the second support portion 424 are in their folded posture.

The stop-reset piece 406 may be a plate extending in the first direction A. By setting the distance between the stop-reset pieces 406 and the first main body portion 413 or the second main body portion 423 in the vertical direction to be smaller than the length of the first main body portion 413 or the second main body portion 423 when the first support portion 414 and the second support portion 424 are in the unfolded posture above the body part, the stop-reset piece 406 can play a role of stopping the first support portion 414 and the second support portion 424.

Referring to FIGS. 4-7, the first support portion 414 rotates from the side of the first main body portion 413 away from the second end to the unfolded posture. When the first driving assembly 411 drives the first support assembly 412 to move away from the carrier 5 to reset, the elastic driving piece 407 still exerts a pushing force on the first support portion 414; and the stop-reset piece 406 at the corresponding end of the first support portion 414 can abut against the first support portion 414, and applies a force opposite to the elastic force of the elastic driving piece 407 to the first support portion 414 when the first support assembly 412 moves to reset, forcing the first support portion 414 to reverse to the folded posture. Similarly, the second support portion 424 rotates from the side of the second main body portion 423 away from the second end to the unfolded posture. When the second driving assembly 421 drives the second support assembly 422 to move away from the carrier 5 to reset, the elastic driving piece 407 still exerts a pushing force on the second support portion 424; and the stop-reset piece 406 at the corresponding end of the second support portion 424 can abut against the second support portion 424, and applies a force opposite to the elastic force of the elastic driving piece 407 to the second support portion 424 when the second support assembly 422 moves to reset, forcing the second support portion 424 to reverse to the folded posture.

The second support portion 424 and the first support portion 414 will eventually be housed under the base 310 or the stop-reset piece 406 when in their folded posture.

Because the distances between the base 310 and the first main body portion 413 and between the base 310 and the second main body portion 423, or between the stop-reset piece 406 and the first main body portion 413 and between the stop-reset piece 406 and the second main body portion 423 are small, the first support portion 414 and the second support portion 424 can always be remained in their folded posture. When the first support portion 414 and the second support portion 424 extend to the outside of the stop-reset piece 406, the first support portion 414 and the second support portion 424 are no longer affected by the corresponding stop-reset pieces, and can be unfolded under the action of the elastic driving piece 407.

The transfer robot in an embodiment includes a distance sensor for detecting the distances between the auxiliary support device 400 and the carriers 5; and the auxiliary support device 400 extends out from two sides of the transfer robot according to the distances detected by the distance sensor.

The distance sensor can be additionally arranged, which can be a three-dimensional imaging module or an infrared sensor, etc; and the image acquisition apparatus of the telescopic fork assembly can also be used, that is, the distance between the telescopic fork assembly and the carrier 5 can be obtained through the detection information of the position detection member on the telescopic fork assembly, and the distance that the auxiliary support device 400 should extend can be calculated by the controller of the transfer robot and fed back to the auxiliary support device 400 to control the extension distances of the auxiliary support device 400.

In an embodiment, the distance sensor can only detect the distance between the carrier 5 at one side of the transfer robot and the auxiliary support device 400, and the distance between the carrier 5 at the other side and the auxiliary support device 400 can be reversely deduced by the controller of the transfer robot based on the width of the roadway. For example, after the transfer robot moves to the roadway, the transfer robot needs to pick up and store containers from the carriers 5 at the left or right side of the transfer robot. At this time, the position information of the auxiliary support device 400 from the left carrier 5 is identified by the distance sensor, and the position information is fed back to the left support mechanism (i.e. the first support mechanism 410) to extend out by a corresponding distance. The first driving assembly 411 of the first support mechanism at the left side drives the first support assembly 412 through the first transmission assembly 416 to extend out, and the first support portion 414 rotates around the left rotating shaft 405 under the action of the elastic driving piece 407 at the left side until it reaches in the vertical position and is supported on the cross beam 11 of the left carrier 5; The controller deduces the extension distance of the right support mechanism (i.e. the second support mechanism 420) based on the position information detected by the distance sensor, the width of the roadway and the corresponding width of the auxiliary support device, and the second support mechanism at the right side controls the second driving assembly 421 to drive the second support assembly 422 through the second transmission assembly to extend out based on the extrapolated distance. The second support portion 424 at the right side rotates around the rotating shaft 405 at the right side under the action of the elastic driving piece 407 on the right side until it reaches the vertical position and is supported on the cross beam 11 of the right carrier 5, so as to achieve the function of stable support, and then the telescopic fork assembly performs the action of picking and placing containers.

The working process of the transfer robot in an embodiment is roughly as follows: a top control system (i.e. a general control system in the warehouse logistics system) controls the transfer robot to move to the designated position near the carrier 5, and the transfer robot (that is, the controller in the transfer robot) controls the lifting device 200 to drive the pick-and-place assembly 300 and the auxiliary support device 400 to move in the vertical direction, and the pick-and-place assembly 300 moves to the designated height corresponding to the target container; Then, based on the detection information of the distance sensor, the transfer robot controls the first support assembly 412 of the first support mechanism 410 and the second support assembly 422 of the second support mechanism 420 to extend out by corresponding distances respectively and then abut against the carriers 5 at two sides of the transfer robot respectively, and the telescopic fork assembly of the pick-and-place assembly 300 performs the action of taking out or storing containers; When taking out or storing containers is completed, the telescopic fork assembly of the pick-and-place assembly 300 returns to its original position, the first driving assembly 411 of the first support mechanism 410 receives the control instruction of the transfer robot and retracts the first support assembly 412, and the first support portion 414 is folded and retracted to its original position under the action of the corresponding stop-reset piece 406. Similarly, the second support mechanism 420 is reset.

The first support mechanism 410 and the second support mechanism 420 of the auxiliary support device 400 in an embodiment can extend or retract from two sides synchronously.

In an embodiment, by adding the auxiliary support device 400 below the pick-and-place assembly 300 of the transfer robot, when taking out or storing the container, the auxiliary support device 400 is turned on, and the first support portion 414 of the first support mechanism 410 and the second support portion 424 of the second support mechanism 420 bounce out and are supported on the cross beams 11 of the carriers 5 at two sides of the roadway. When taking out or storing of the container is completed, the first support portion 414 of the first support mechanism 410 and the second support assembly 420 of the second support mechanism 420 is folded to their original position. Because the auxiliary support device 400 needs to be stored under the pick-and-place assembly 300 and ascend and descend along with the pick-and-place assembly 300 simultaneously, the auxiliary support device 400 needs to be compact, occupy less space and have light weight.

To sum up, the auxiliary support device 400 in an embodiment has the advantages of compact size, small occupied space, light weight, low processing difficulty, low cost, etc. The auxiliary support device 400 can reduce the shaking of the vehicle body when the transfer robot is taking out or storing the container at a high position, and help the transfer robot stably take out or store the container on the high shelf. At the same time, the auxiliary support device 400 can help the transfer robot to stably take out or store containers on a higher shelf and maximize the utilization of the vertical space of the warehouse; Moreover, the auxiliary support device 400 can be adaptively adjusted according to factors such as uneven ground, car body inclination and the like.

Embodiment 2

Figure 8:
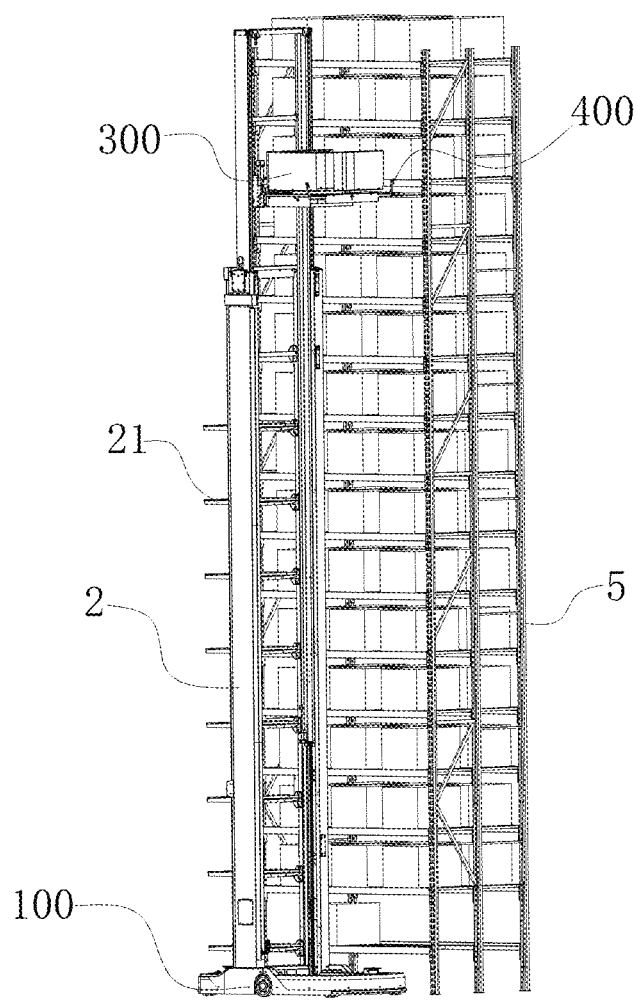
FIG. 8 is a structural schematic diagram of a transfer robot and a carrier of the present disclosure.

Referring to FIG. 8, the present disclosure provides a transfer robot. The transfer robot is configured to move to a storage area to pick and place a target container. In an embodiment, the storage area may include a plurality of carriers 5 and roadways defined by adjacent carriers 5. Target container is stored on the carrier 5, and can be containers used for loading goods in the field of logistics, including but not limited to a bin, a pallet, an original box, a packing box, a cargo box, a storage box, etc., which is not limited by the present disclosure.

The transfer robot of the present disclosure includes a chassis assembly 100, a lifting device 200, a pick-and-place assembly 300 and an auxiliary support device 400. The chassis assembly 100 is configured to support the transfer robot on a working surface, and the working surface may include the roadway between the carriers 5 and the ground outside the storage area. The chassis assembly 100 can be provided with a traveling driving wheel and/or a universal wheel matched with the traveling driving wheel, and the traveling driving wheel and/or the universal wheel are matched together to drive the transfer robot to walk and turn on the working surface, which is convenient for the transfer robot to subsequently take and place the target container.

The chassis assembly 100 is also configured to support other components of the transfer robot, such as the lifting device 200, the pick-and-place assembly 300 and the auxiliary support device 400. The lifting device 200 includes a gantry assembly 2, and the gantry assembly 2 is arranged on the chassis assembly 100 and is configured to extend upward from the chassis assembly 100. Generally, the extension height of the gantry assembly 2 is the same as or higher than the height of the carrier 5, which is beneficial for the transfer robot to pick and place the target objects located in different positions on the carrier 5.

In one implementation of the present disclosure, since the height of the transfer robot needs to be adjusted according to the height of the carrier, if the height of the gantry assembly 2 that cannot be adjusted is set too large, it will not only affect the transfer robot's entry into and exit from the warehouse, but also affect the transfer robot's stability during the movement. Therefore, in an embodiment, the gantry assembly 2 includes a fixed gantry and a movable gantry moving in the height direction of the fixed gantry. The pick-and-place assembly 300 is configured to move in the height direction along the movable gantry to pick up and place the target container. In an implementation of the present disclosure, the pick-and-place assembly 300 can be arranged on the last-stage movable gantry, so that the pick-and-place working range of the pick-and-place assembly 300 can cover the height spaces of the fixed gantry and the movable gantry. The pick-and-place assembly 300 moves along the gantry assembly 2 in the height direction of the gantry assembly 2 to pick up and place the target object. Because the gantry assembly 2 includes heights suitable for the carriers 5, the pick-and-place assembly 300 can pick up and place the target container at any position on the carriers 5, so there will be no position that cannot be reached on the carrier.

During the movement of the transfer robot driven by the chassis assembly 100, all the movable gantries in the gantry assembly 2 can be in a retracted state relative to the fixed gantry in the gantry assembly 2, that is, all the movable gantries are in the lowest matching position relative to the previous-stage gantry, and the overall height of the gantry assembly 2 is in the lowest state. In this state, compared with the transfer robot with a higher-height non-adjustable gantry assembly 2, the transfer robot of the present disclosure can walk when the movable gantry is in the retracted state, and can keep the moving stability of the transfer robot. In addition to the above-mentioned scene where the transfer robot picks up and places the target object on the high-height carrier, the transfer robot can also pick up and place the target container on the low-height carrier 5, therefore, the transfer robot of the present disclosure can flexibly adjust the overall height of the gantry assembly 2 to adapt to the carriers 5 with different heights, thus improving the working scope of the transfer robot.

When the pick-and-place assembly 300 is arranged on the last-stage movable gantry, the pick-and-place assembly 300 can be guidably matched with the last-stage movable gantry, and the movements of the movable gantry and the pick-and-place assembly 300 are independent of each other, that is, there is no linkage relationship between the movements of the movable gantry and the pick-and-place assembly 300, thus improving the flexibility of the self-movement of the pick-and-place assembly 300. For those skills in the art, the movement of the movable gantry and the pick-and-place assembly 300 can be synchronized, that is, the movement of the movable gantry is coupled with the movement of the pick-and-place assembly 300, which is not limited by this disclosure.

Figure 9:
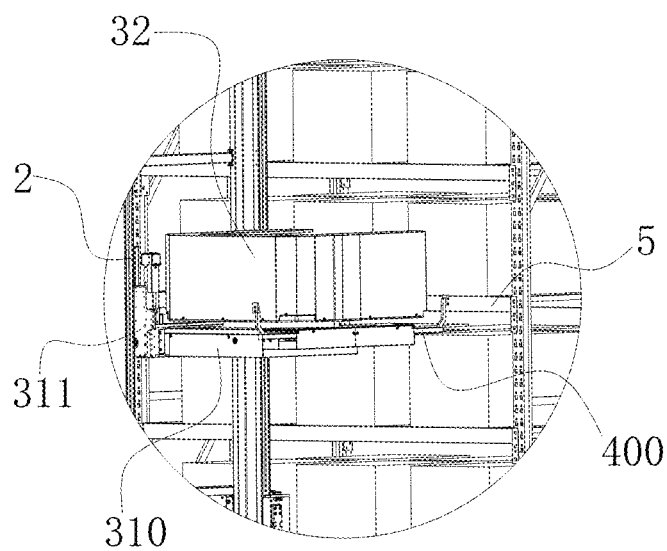
FIG. 9 is a partial enlarged diagram of a position of a pick-and-place assembly in FIG. 8.

Referring to FIG. 9, the pick-and-place assembly 300 includes a base 310 and a pick-and-place mechanism 32 rotatably connected to the base 310, and the base 310 is configured to drive the pick-and-place mechanism 32 to ascend or descend along the gantry assembly 2. The base 310 can move along the gantry assembly 2 in the height direction of the gantry assembly 2, so as to take the pick-and-place mechanism 32 to different target heights to pick and place different target containers. The pick-and-place mechanism 32 can rotate to different angles relative to the base 310, so as to pick and place target containers in different directions. The pick-and-place mechanism 32 may include a pick-and-place member 323 for picking and placing containers. The pick-and-place member 323 can be a mechanical structure, which can perform picking and placing containers, such as a telescopic fork assembly, a fork, a mechanical arm and the like, and the specific structure of the pick-and-place member 323 is not limited in this disclosure.

In one implementation of the present disclosure, referring to FIG. 9, a side of the base 310 adjacent to the gantry assembly 2 is configured to be connected to the gantry assembly 2 through a lifting mechanism 311. The base 310 can be matched with the gantry assembly 2 through the lifting mechanism 311, so that the base 310 and the pick-and-place mechanism 32 located on the base 310 can be driven to ascend or descend to the target position synchronously under the action of the corresponding driving mechanism. The present disclosure does not specifically limit the way in which the lifting mechanism 311 cooperates with the gantry assembly 2.

Figure 10:
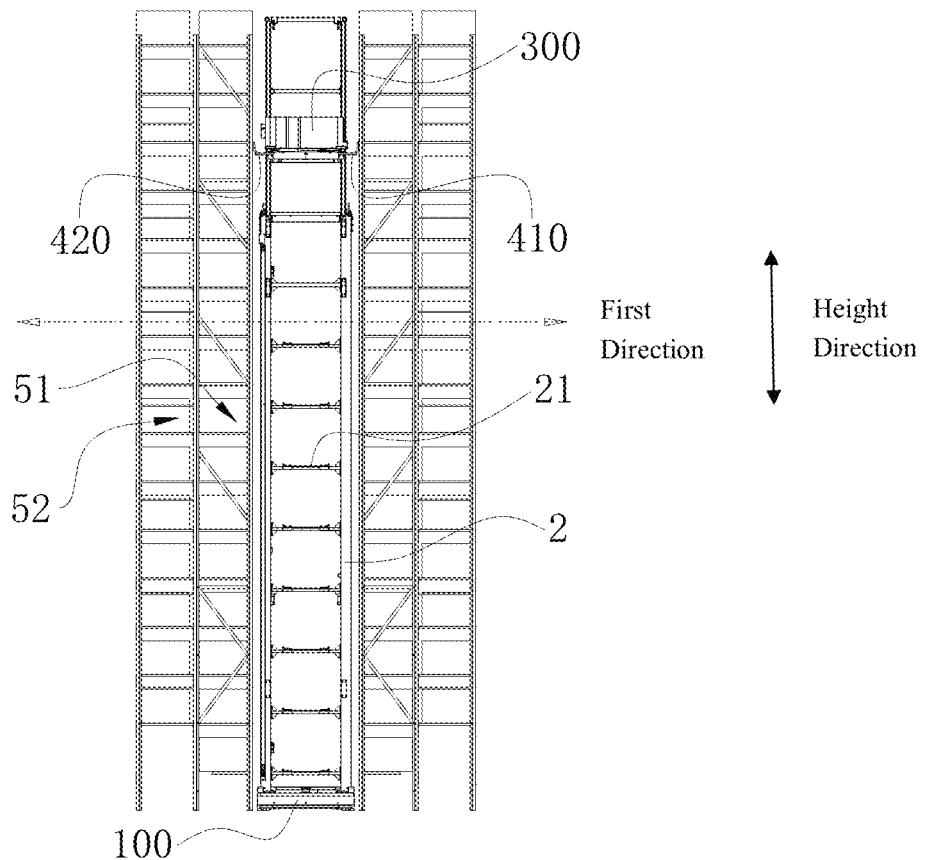
FIG. 10 is a front diagram of a transfer robot and a carrier of the present disclosure.

Referring to FIGS. 8 to 10, the auxiliary support device 400 is arranged on the base, in an embodiment, it may be disposed on the side of the base 310 away from the gantry assembly 2. The auxiliary support device 400 is configured to move between an extended position and a retracted position. When in the extended position, the auxiliary support device 400 extends out until abutting against the carriers 5; and when in the retracted position, the auxiliary support device 400 is retracted relative to the carriers 5. The auxiliary support device 400 is in the retracted position in the initial state, and at this time, the auxiliary support device 400 does not play a supporting role. When support is needed, the auxiliary support device 400 extends out relative to the transfer robot until the auxiliary support device 400 abuts against the carrier 5 located at one side of the transfer robot, where the auxiliary support device 400 is in the extended position. This is beneficial to keep the relative position between the pick-and-place module 300 and the carrier 5 stable, so as to achieve the purpose of improving the success rate of picking-and-place module 300 to pick and place the target container.

In an embodiment, as shown in FIG. 9, the auxiliary support device 400 is arranged on the base 310 at a position deviating from the axis of the pick-and-place mechanism 32, and when in the retracted position, the auxiliary support device 400 is located outside the rotation area of the pick-and-place mechanism 32. In an embodiment, the auxiliary support device 400 can be arranged on the side wall of the base 310, and when the pick-and-place mechanism 32 rotates relative to the base 310, the auxiliary support device 400 in the retracted position will not interfere with and collide with the pick-and-place mechanism 32, and there is no need to arrange an additional structure for retracting the auxiliary support device 400 above the auxiliary support device 400, which can make the structure of the auxiliary support device 400 simpler. When the auxiliary support device 400 is in the extended position, the auxiliary support device 400 can also be kept in the extended position to continue supporting when the pick-and-place mechanism 32 rotates, thus making the rotation of the pick-and-place mechanism 32 more stable.

According to the present disclosure, the auxiliary support device 400 is arranged on the base and the auxiliary support device 400 can extend out to the position where the auxiliary support device 400 abuts against the carriers 5, so that the transfer robot is supported in the process of picking and placing containers, the impact of containers on the shelves and the robot when picking and placing container boxes is reduced, and the stability of the robot when picking and placing container boxes is enhanced. In addition, the auxiliary support device 400 of the present disclosure is configured to be located outside the rotation area of the pick-and-place mechanism 32, and the auxiliary support device 400 does not need to be retracted when the pick-and-place mechanism 32 rotates, so that the structure of the auxiliary support device 400 can be simplified.

Figure 12:
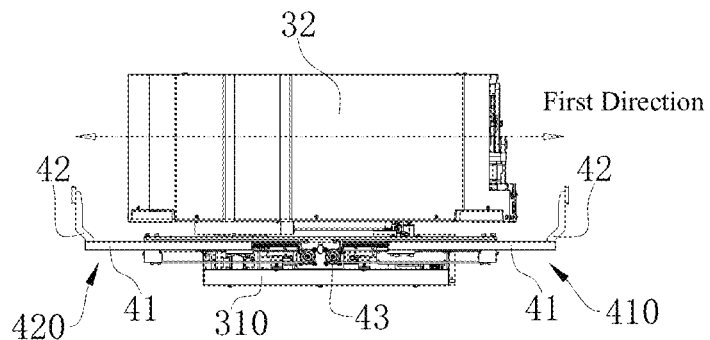
FIG. 12 is a front diagram of a pick-and-place assembly and an auxiliary support device of the present disclosure.

In one implementation of the present disclosure, referring to FIGS. 10 and 12, the auxiliary support device 400 includes a first support mechanism 410 for protruding in a first direction and a second support mechanism 420 protruding in an opposite direction to the first direction. Referring to the view directions of FIGS. 10 and 12, the arrow at the right end of the dotted line points to the first direction and the arrow at the left end points to the opposite direction. The pick-and-place mechanism 32 is configured to extend in the first direction or the opposite direction to complete the picking and placing of containers located in the first direction or the opposite direction. The first direction in this disclosure is defined to clearly explain the picking and placing action of the pick-and-place mechanism 32. For the convenience of description, this disclosure defines the first support mechanism 410 to protrude in the first direction and the second support mechanism 420 to protrude in the opposite direction of the first direction. The specific structures of the first support mechanism 410 and the second support mechanism 420 are completely consistent, and the only difference is that their protruding directions are different.

The transfer robot is configured to control the first support mechanism 410 and the second support mechanism 420 to extend the same displacement or different displacements to the opposite sides respectively based on the detected distances between the transfer robot and the carriers 5 located in the first direction and the width of the roadway.

In an application scenario of the present disclosure, the width of the roadway between the carriers 5 is a fixed value, and a distance sensor may be provided in the pick-and-place assembly 300 or the auxiliary support device 400. For example, the distance sensor can measure the distance information between itself and the carrier 5 in the first direction and transmit the distance information to the control server; and the control server can calculate the length by which the first support mechanism 410 needs to extend out according to preset information (such as the distance data information in the first direction between the distance sensor and the first support mechanism 410); and the first support mechanism 410 can extend out by a corresponding distance under the control of the control server to abut against the carrier 5 located in the first direction; At the same time, the control server can also calculate the length by which the second support mechanism 420 needs to extend out according to the width of the roadway; and the second support mechanism 420 can extend by the corresponding length under the control of the control server to abut against the carrier 5 located in the opposite direction of the first direction. In addition to the above-mentioned distance sensor, distance information can also be obtained by setting up image acquisition apparatus and other ways. The present disclosure does not specifically limit the way in which the transfer robot obtains the distance information.

In an implementation of the present disclosure, the transfer robot is configured to, when the detected distance between the transfer robot and the carrier 5 located in the first direction is greater than or less than a threshold value, compensate the displacements of the first support mechanism 410 and the second support mechanism 420 based on the difference between the detected distance and the threshold value. In an embodiment, the width of the roadway is a fixed value, and the extension displacements of the first support mechanism 410 and the second support mechanism 420 can be preset by the control server according to the width of the roadway. The preset extension displacements may not meet the support requirements of practical application scenarios. In an embodiment, in an ideal situation, the transfer robot can travel to the center line of the roadway and the pick-and-place assembly 300 and the auxiliary support device 400 in a high position are not skewed and offset. At this time, the first support mechanism 410 and the second support mechanism 420 can realize support function only by extending out by the preset displacements.

In the practical application scenario, the transfer robot is probably not in the center line of the roadway. In order to adapt to the scene where the robot is skewed, the present disclosure sets a threshold range. When the distance between the transfer robot and the carrier 5 in the first direction is within the threshold range, which means that the skew of the transfer robot is not serious, then the first support mechanism 410 and the second support mechanism 420 can continue to extend out by the preset displacements. At this time, although the auxiliary support device 400 can't abut against the carriers in a seamless manner, the supporting force the auxiliary support device provides is still enough to keep the transfer robot stable. When the distance between the transfer robot and the carriers 5 in the first direction is greater than or less than the threshold value, which indicates that the robot is seriously skewed, and at this time, it is necessary to compensate the extension distance of the auxiliary support device 400 based on the difference value between the distance between the transfer robot and the carriers 5 and the threshold value. In order to facilitate understanding, the following numerical values are substituted to describe the application scenario in detail as an example.

The control server preset the first support mechanism 410 and the second support mechanism 420 to extend out by 80 cm respectively in an ideal state to realize a stable support, and a set threshold range of the distance between the transfer robot and the carrier 5 is 75 to 85 cm. That is, when it is detected that the distance between the transfer robot and the carrier 5 in the first direction is in the range of 75 to 85 cm, the first support mechanism 410 and the second support mechanism 420 can still extend out by 80 cm to realize the supporting function. However, when it is detected that the distance between the transfer robot and the carrier 5 in the first direction is 40 cm, which indicates that the distance between the transfer robot and the carrier 5 is beyond the threshold range, the protruding distances of the first support mechanism 410 and the second support mechanism 420 need to be adjusted. For example, the first support mechanism 410 can extend out by 60 cm and the second support mechanism 420 can extend out by 100 cm. Under the action of the auxiliary support device 400, the skew degree of the transfer robot can be corrected to a certain extent, so as to reach the standard for picking and placing the container and improve the success rate of picking and placing the container.

Figure 11:
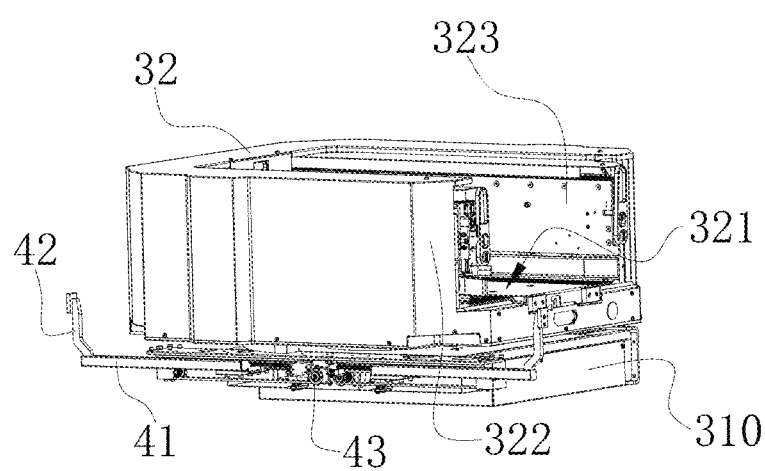
FIG. 11 is a structural schematic diagram of a pick-and-place assembly and an auxiliary support device of the present disclosure.

In one implementation of the present disclosure, referring to FIG. 11, the auxiliary support device 400 includes a support portion 41 and an abutting portion 42 connected to the support portion 41. In an embodiment, the support assembly includes the support portion 41 and the abutting portion 42 connected to the support portion 41. The support portion 41 includes a first main body portion 413 and a second main body portion 423, and the abutting portion 42 includes a first support portion 414 and a second support portion 424. The first support assembly 412 includes a first main body portion 413 and a first support portion 414, and the second support portion 424 includes a second main body portion 423 and a second support portion 424. That is, the support portion 41 of the first support mechanism 410 is the first main body portion 413, and the support portion 41 of the second support mechanism is the second main body portion 423. The abutting portion 42 of the first support mechanism 410 is the first support portion 414, and the abutting portion 42 of the second support mechanism is the second support portion 424. When in the extended position, the support portion 41 is configured to extend out relative to the base 310 until the abutting portion 42 abuts against the carrier 5. When in the retracted position, the support portion 41 is configured to retract until the abutting portion 42 moves to a position adjacent to the base 310; and in the retracted position, the abutting portion 42 is configured to be located outside the rotation area of the pick-and-place mechanism 32. As shown in FIG. 11, the support portion 41 can be a slender rod-shaped structure. If the end of the support portion 41 directly abuts against the carrier 5, the contact area between the support portion 41 and the carrier 5 is too small and the supporting effect is not good. Therefore, the abutting portion 42 for abutting against the carrier 5 may be provided at the end position of the support portion 41.

In an embodiment, the support portion 41 is configured to be arranged at a position lower than the pick-and-place mechanism 32 on the base 310, and the abutting portion 42 is configured to extend upward from the support portion 41 until partially overlapping with the pick-and-place mechanism 32 in the height direction of the pick-and-place mechanism 32. When in the extended position, the abutting portion 42 extends to a position away from the pick-and-place mechanism, and naturally lies outside the rotation area of the pick-and-place mechanism 32, so it is obvious that the abutting portion 42 will not block the pick-and-place mechanism 32 from picking and returning the container box. However, in the retracted position, the abutting portion 42 propped up upward partially overlaps with the pick-and-place mechanism 32 in the height direction of the pick-and-place mechanism 32, and the abutting portion 42 will move to a position adjacent to the base 310 along with the retraction of the support portion 41, so the abutting portion 42 may interfere with the pick-and-place mechanism 32.

In order to solve the above-mentioned problem, the abutting portion 42 can be arranged in a foldable structure, and the abutting portion 42 will be in an open state only in the extended position for supporting, and will be folded in the direction flush with the support portion 41 in the retracted position, so as to avoid interfering with the pick-and-place mechanism 32. In this disclosure, in order to simplify the structure of the abutting portion 42 so as to reduce the production cost, the auxiliary support device 400 is arranged outside the rotation area of the pick-and-place mechanism 32 as a whole, thus providing a structure without need to fold the abutting portion 42 and without interference.

In an implementation of the present disclosure, the pick-and-place mechanism 32 includes a bearing portion 321 for bearing containers, and the abutting portion 42 is configured to extend upward from the support portion 41 to a height higher or lower than a bearing surface of the bearing portion 321. The auxiliary support device 400 is arranged on the base 310 at a position corresponding to the outside of the side wall of the bearing portion 321, and is configured to extend out in a first direction, and the bearing portion 321 is configured to at least rotate to face the first direction, so as to take and place containers located in the first direction. In the first direction, the height of the bearing end face of the bearing portion 321 is the height of the opening of the pick-and-place mechanism 32 for picking and placing the containers. As long as the height of the abutting portion 42 extending upward is set to be lower than the height of the bearing end face of the bearing portion 321, it can be ensured that the opening for picking and placing of the container box pick-and-place mechanism will not be blocked by the abutting portion 42. On the other hand, when the height of the abutting portion 42 extending upwards is higher than the height of the bearing end face of the bearing portion 321, since the auxiliary support device 400 in the present disclosure is integrally arranged at a position outside the side wall of the base 310, even if the abutting portion 42 is located at a position higher than the bearing end face, it will not affect the pick-and-place mechanism 32 to pick and place the container.

In an embodiment, when the opening of the pick-and-place mechanism 32 faces the first direction, the orthographic projections of the side wall of the bearing portion 321 and the abutting portion 42 in the first direction do not overlap or at least partially overlap. If the orthographic projections of the side wall of the bearing portion 321 and the abutting portion 42 in the first direction do not overlap at all, it can be ensured that the abutting portion 42 will not collide with the pick-and-place mechanism 32 in the process of the abutting portion 42 moving from the extended position to the retracted position. If the orthographic projection of the side wall of the bearing portion 321 and the abutting portion 42 in the first direction at least partially overlaps, the abutting portion 42 may collide with the side wall of the pick-and-place mechanism 32 in the process of the abutting portion 42 moving from the extended position to the retracted position.

In order to completely avoid collision, an embodiment also provides an avoidance structure 322 at the edge position of the bearing portion 321 facing the abutting portion 42. As shown in FIG. 11, the avoidance structure 322 can be arranged at the outer corner position of the pick-and-place mechanism 32, and the outer corner of the pick-and-place mechanism 32 can be arranged in a corner-cutting structure, so that the abutting portion 42 will not collide with the bearing portion 321 of the pick-and-place mechanism 32 when the abutting portion 42 is retracted. The size of the cutting angle and the specific setting form of the avoidance structure 322 can be set according to the actual shape and position of the abutting portion 42, which is not limited by this disclosure.

Figure 13:
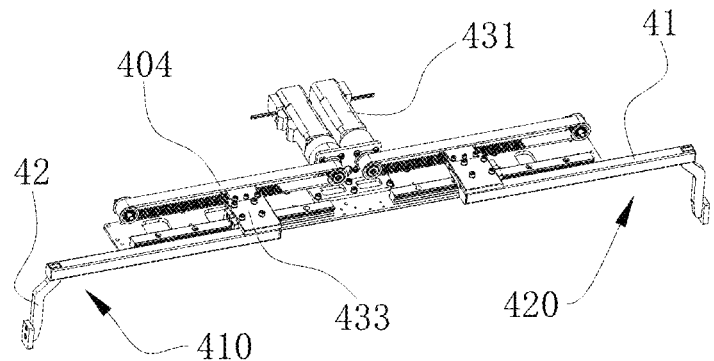
FIG. 13 is a schematic structural diagram of an auxiliary support device of the present disclosure.
Figure 14:
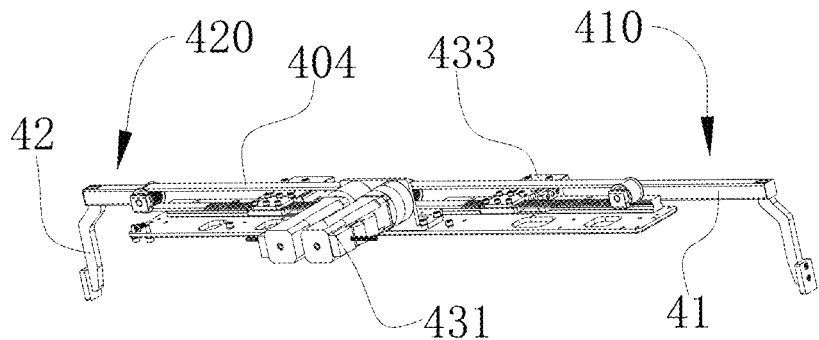
FIG. 14 is a schematic structural diagram of an auxiliary support device of the present disclosure from another angle.

In one implementation of the present disclosure, referring to FIGS. 12 to 14, the auxiliary support device 400 includes a movement mechanism 43, which includes a driving assembly and a transmission assembly, wherein the driving assembly may include a motor 431. The movement mechanism 43 is configured to drive the support portion 41 to move between the extended position and the retracted position. The movement mechanism 43 includes the motor 431 arranged on the base 310 and the transmission assembly driven by the motor 431. The support portion 41 is guidably fitted on the base 310 and is configured to be connected with the transmission assembly through a connecting portion 433. The connecting portion 433 is the first slider 450 or the second slider 460. The transmission assembly is configured to drive the support portion 41 to move between the extended position and the retracted position. As shown in FIG. 13, the output end of the motor 431 can be connected with a driving wheel in a transmission way, and the transmission assembly can be a traction transmission component 404, one end of the traction transmission component 404 is wound on the driving wheel and the other end of the traction transmission component 404 is wound on the transmission wheel. The driving wheel and the transmission wheel can be constructed as the same size, and their axes are flush in the horizontal direction. When the motor 431 rotates, the driving wheel rotates with it, and the traction transmission component 404 is driven by the driving wheel to move. The traction transmission component 404 is provided with a connecting block, and one end of the connecting block 433 is fixed on the traction transmission component 404, and the other end is fixed on the support portion 41. When the traction transmission component 404 rotates between the transmission wheel and the driving wheel, the connecting block 433 can follow the movement, thereby driving the support portion 41 to move between the extended position and the retracted position relative to the base 310. There are many ways to control the movement of the support portion 41, and an embodiment only provides one specific example. The driving mode of the support portion 41 is not specifically limited in this disclosure. Besides the movement mode of the traction transmission component 404, the transmission assembly can also adopt other transmission modes commonly used in this field, such as chain, lead screw, gear and rack.

In an implementation of the present disclosure, the first support mechanism 410 and the second support mechanism 420 are configured to protrude outward in a manner far away from each other to respectively abut against the carriers 5 at two opposite sides of the roadway. The two auxiliary support devices 400 are independently controlled and are configured to be symmetrically distributed on the base 310. Referring to FIG. 13 and FIG. 14, the two auxiliary support devices 400 are respectively provided with a set of corresponding movement mechanisms 43, and the two motors 431 can rotate at different angles under the control of the control server, so that the support portion 41 of the first support mechanism 410 and the support portion 41 of the second support mechanism 420 respectively extend out by different displacements, so that the abutting portions 42 of the two auxiliary support devices 400 respectively abut on the carriers 5 at two sides of the roadway.

In practical application scenarios, the height position of the pick-and-place mechanism 32 may be adjusted when picking and placing the container box. At this time, if the auxiliary support device 400 is in the extended position, the contact portion 42 will rub against the cross beam of the carrier 5 during the up-down movement of the pick-and-place assembly 300. This will cause damage to the cross beam of the carrier 5, and in addition, the abutting portion 42 will also be worn, which will shorten its service life. In order to solve the above-mentioned problems, the present disclosure designs the abutting portion 42.

In one implementation of the present disclosure, when the auxiliary support device 400 is in the extended position and the pick-and-place assembly 300 ascends or descends along the gantry assembly 2, the abutting portion 42 in the auxiliary support device 400 is configured to be movably fitted with the carrier 5, which can be in a slidable engagement, a rolling engagement, or in other low-friction movable engagement modes. For example, the part of the abutting portion 42 that contacts with the carrier 5 adopts a self-lubricating material. Changing the friction coefficient of the part of the abutting portion 42 contact with the carrier 5 will not affect the supporting function of the auxiliary support device 400 at all. The self-lubricating material has low friction coefficient and strong wear resistance, which can effectively reduce the friction force at the abutting position in the vertical direction.

In an embodiment, the self-lubricating material may include nylon, Polyoxymethylene (POM), Polyamide (PA), Polybutylene Terephthalate (PBT), Polycarbonate (PC), carbon fiber, Polytetrafluoroethylene (PTFE), Polyphenylene Sulfide (PPS), graphite, silicone, etc. The contact surface of the abutting portion 42 contacting with the carrier 5 or the body of the abutting portion 42 can be made of any of the above materials, or other self-lubricating materials with low friction coefficient and strong wear resistance can be selected, and the selection of self-lubricating materials is not specifically limited in this disclosure.

In order to improve the working efficiency of the transfer robot, in one implementation of the present disclosure, referring to FIGS. 8 and 10, the gantry assembly 2 can be provided with a temporary storage tray 21 for temporarily storing containers, and at least one temporary storage tray 21 is arranged on the side of the gantry assembly 2 opposite to the pick-and-place assembly 300. The containers taken out by the pick-and-place mechanism 32 can be temporarily stored on the temporary storage tray 21, and then the pick-and-place assembly 300 can continue to take and place containers.

For example, referring to FIG. 8, eight temporary storage trays 21 are perpendicularly and sequentially arranged at intervals at one side of the gantry assembly 2, and the temporary storage trays 21 can be constructed into a rectangle with a certain length and width to carry containers. The containers taken out from the carriers 5 in the first direction or in the opposite direction of the first direction by the pick-and-place mechanism 32 can be temporarily stored on the temporary storage tray 21. After the container in the first direction or the opposite direction is taken out by the pick-and-place mechanism 32, it rotates to face any temporary tray 21 and places the container on the temporary tray 21, thus realizing the transfer of the container to the temporary tray 21, and then the pick-and-place mechanism 32 can do other work. Or, the pick-and-place mechanism 32 can rotate to face the corresponding temporary storage tray 21 of the container, take the container out of the temporary storage tray 21, and then rotate to the first direction or the opposite direction, and then transfer the container to the corresponding position of the container in the first direction or the opposite direction to transfer the container out of the temporary storage tray 21.

In the actual scene of picking containers, the transfer robot can pick up the container from the carrier 5 or the temporary storage tray 21. In order to prevent the container from being stuck by the edge of the pick-and-place mechanism 32 and causing the failure of picking and placing, the method that the carrier 5 or the temporary storage tray 21 is higher than the pick-and-place mechanism 32 by a certain distance is usually adopted. Because the container and the goods in the container are relatively heavy, under the action of gravity and height difference, the container will cause a relatively large gravity impact on the pick-and-place mechanism 32 and the transfer robot, which will not only easily damage the layer plates of the carrier 5 and the transfer robot, but also cause a relatively large impact and vibration on the layer plates of the carrier 5 and the transfer robot. Other containers stored on the layer plates of the same carrier 5 will be deviated under the vibration of the layer plates of the carrier 5, and even protrude out of the carrier 5 or enter the deeper position of the carrier 5, resulting in chaotic arrangement of the containers and easy failure in picking and placing container boxes.

In order to avoid the above situation, it is necessary to design the pick-and-place mode of the transfer robot.

In one implementation of the present disclosure, the transfer robot is configured to control the pick-and-place assembly 300 to move in the height direction to a first height position where the bearing portion 321 is lower than the bearing surface where the container is stored; and control the pick-and-place assembly 300 to move upward to the second height position after the pick-and-place member 323 takes the container on the bearing surface to the first predetermined position, so that the pick-and-place member 323 can completely take the container to the bearing portion 321. When the pick-and-place assembly 300 moves between the first height position and the second height position, the auxiliary support device 400 is configured to remain in the extended position. In an embodiment, the pick-and-place assembly 300 is configured to simultaneously take the container from the first predetermined position to the bearing portion 321 in the process of ascending from the first height position to the second height position; or, the pick-and-place assembly 300 is configured to take the container from the first predetermined position to the bearing portion 321 after it is lifted from the first height position to the second height position.

The bearing surface on which the containers are stored can be the support surface of the storage position on which the containers are stored on the carrier 5, or the support surface of the temporary storage tray 21 on which the containers are provisionally stored of the gantry assembly 2 of the transfer robot. For convenience of description, the plane for supporting the containers is collectively referred to as the bearing surface in this disclosure.

When the transfer robot carries out the task of picking up container boxes, firstly, it is necessary to control the pick-and-place assembly 300 to move in the height direction to a first height position lower than the bearing surface where the containers are stored. After the control server sends a container box picking instruction, the transfer robot can obtain the position information of the target container to be picked up, and the preset height information of each position in the storage system is stored in the control server, and the pick-and-place assembly 300 can be ascended and descended to the preset height position where the target container is located.

There may be a slight deviation between the preset height information and the actual height, and the pick-and-place assembly 300 may be provided with an image acquisition apparatus. The image acquisition apparatus can acquire the specific position information of the target container, and control the pick-and-place assembly 300 to move to the first height position where the bearing portion 321 is slightly lower than the bearing surface where the container is stored. After moving to the first height position, the control server can control the pick-and-place member 323 to extend out and start picking up container boxes.

The control server can control the pick-and-place member 323 to extend out and transport the container from the storage position of the carrier 5 or the temporary storage tray 21 to the bearing portion 321. During the moving process, the transfer robot can acquire images of the container through its own image acquisition apparatus, so as to determine the position of the container during the moving process according to the image acquisition results, and thus obtain the displacement data of the container. In addition to obtaining container displacement data through image acquisition results, other detection methods can be adopted, for example, container displacement data can be obtained by detecting the position of the pick-and-place member 323, or container displacement data can be obtained based on the rotation angle of the driving motor corresponding to the pick-and-place member 323. When it is confirmed that the pick-and-place member 323 takes the container on the bearing surface to the first predetermined position according to the container displacement data, it is necessary to control the pick-and-place assembly 300 to move upward to the second height position.

In one implementation of the present disclosure, when the container is located at the first predetermined position, the edge of the container adjacent to the pick-and-place assembly 300 is configured to at least cross the edge of the bearing portion 321 by a predetermined distance. During picking the container box, the container will move to the first predetermined position at a certain moment in the process of moving closer to the bearing portion 321. In an embodiment, when the container is located at the first predetermined position, the edge of the container near the pick-and-place assembly 300 is configured not to fall on the bearing portion 321, or the edge of the container far from the pick-and-place assembly 300 is configured not to fall on the bearing portion 321.

That is to say, the container at the first predetermined position has not been completely transported to the bearing portion 321. When the bearing portion 321 is at the first height position lower than the bearing surface, if the container is completely transported to the bearing portion 321, the bearing portion 321 will bear a large gravity impact. Therefore, when the container is not completely transported to the bearing portion 321, that is, when the container moves to the first predetermined position, it is necessary to raise the pick-and-place assembly 300 to the height of the retracted position, so as to avoid the above-mentioned gravity impact. The container at the first predetermined position has passed the edge of the bearing portion 321, so the container picking failure will not be caused by the container being caught by the edge of the pick-and-place mechanism 32 when the pick-and-place assembly 300 is properly raised at this time.

In one implementation of the present disclosure, when at the second height position, the bearing portion 321 is lower than the bearing surface, and the height difference between the bearing portion 321 and the bearing surface is smaller than the height difference between the bearing portion 321 and the bearing surface at the first height position; or, when at the second height position, the bearing portion 321 is flush with or higher than the bearing surface. When the container is transported to the first predetermined position by the pick-and-place member 323, the pick-and-place assembly 300 can be lifted upward to the second height position. The bearing portion 321 at the second height position can still be lower than the bearing surface, but the bearing portion 321 at the second height position is closer to the bearing surface than the bearing portion 321 at the first height position, thus reducing the impact of the container on the bearing portion 321. The bearing portion 321 at the second height can also be flush with or higher than the bearing surface, so that the gravity impact of the container on the bearing portion 321 can be eliminated. The second height position can not be much higher than the bearing surface, but only slightly higher than the bearing surface. If the second height position is too high above the bearing surface, the side of the container away from the pick-and-place assembly 300 may not be supported, which may lead to the container falling and the failure of picking the container.

When the pick-and-place assembly 300 moves between the first height position and the second height position, the auxiliary support device 400 is configured to remain in the extended position. The abutting portion 42 of the auxiliary support device 400 can be movably fitted with the carrier 5, so it can still play the function supporting in the extended position when the pick-and-place assembly 300 ascends or descends. This can ensure that the pick-and-place assembly 300 can be stably supported when moving between the first height position and the second height position, thereby improving the stability of the transfer robot.

The auxiliary support device 400 can extend out to the extended position for supporting after the pick-and-place assembly 300 moves to the first height position, or extend out for supporting after the pick-and-place assembly 300 ascends or descends to the preset height position. During the fine adjustment of the pick-and-place assembly 300 from the preset height position to the first height position, the auxiliary support device 400 can be maintained in the extended position to provide stable support for the transfer robot. In the process of ascending or descending to adjust the height of the pick-and-place assembly, the abutting portion 42 is in slidingly fit with the carrier 5, so that the auxiliary support device 400 will not scratch the surface of the carrier and the abutting portion 42 will not be worn.

In the actual scene of returning container, that is, when the container is transported from the bearing portion 321 to the carrier 5 or the temporary storage tray 21, in order to prevent the container from being stuck by the edge of the carrier 5 or the temporary storage tray 21, thus prevent the container from causing the container-returning failure, the method of making the pick-and-place mechanism 32 higher than the carrier 5 or the temporary storage tray 21 by a certain distance is usually adopted. In an embodiment, when the container is completely separated from the pick-and-place mechanism 32, that is, completely contacted with the carrier 5 or the temporary storage tray 21, because the container and the goods therein are relatively heavy, the container will have a relatively large gravity impact on the carrier 5 or the temporary storage tray 21 under the action of the gravity of the container and the height difference, which is easy to damage the carrier 5 and the transfer robot. Other containers stored on the layer plates of the same carrier and containers stored on the temporary storage trays 21 of other layers will be misaligned under the vibration of layer plates of the carrier 5, resulting in chaotic container arrangement and easy failure when returning container.

In order to avoid the above situation, it is necessary to design the container returning mode of the transfer robot.

In one implementation of the present disclosure, the transfer robot is configured to control the pick-and-place assembly 300 to move in the height direction to a third height position where the bearing portion 321 is higher than the target bearing surface when returning the container; and after the container on the bearing portion 321 is taken to the second predetermined position by the pick-and-place member 323, the transfer robot is configured to control the pick-and-place assembly 300 to move downwards to the fourth height position, so that the pick-and-place member 323 can completely return the container to the bearing surface. When the pick-and-place assembly 300 moves between the third height position and the fourth height position, the auxiliary support device 400 is configured to remain in the extended position. In an embodiment, the pick-and-place assembly 300 is configured to return the container from the second predetermined position to the bearing surface while descending from the third height position to the fourth height position; or, the pick-and-place assembly 300 is configured to return the container from the second predetermined position to the bearing surface after descending from the third height position to the fourth height position.

Consistent with the description in the container picking scene, the bearing surface where the container is stored can be the support surface of the storage position where the container is stored on the carrier 5, or the bearing surface of the temporary storage tray 21 where the container is temporarily stored on the gantry assembly 2 of the transfer robot. For convenience of description, the plane for supporting the container is collectively referred to as the bearing surface in this disclosure.

When the transfer robot carries out the task of returning containers, it is necessary to firstly control the pick-and-place assembly 300 to move to the third height position higher than the target bearing surface in the height direction. After the control server sends a container returning instruction, the transfer robot can obtain the position information of the target container to be picked up, and the preset height information of each position in the storage system is stored in the control server, and the pick-and-place assembly 300 can be ascended and descended to the preset height position where the target container is located.

The image acquisition apparatus provided on the pick-and-place assembly 300 can acquire the specific position information of the target container, and accordingly control the pick-and-place assembly 300 to move to the third height position where the bearing portion 321 is slightly higher than the bearing surface where the container is stored. After moving to the third height position, the control server can control the pick-and-place member 323 to start returning container boxes.

The control server can control the pick-and-place member 323 to extend out and transport the container from the bearing portion 321 to the storage position of the carrier 5 or the temporary storage tray 21. During the moving process, the transfer robot can acquire the displacement data of the container by collecting the image information of the container, detecting the position of the pick-and-place member 323, and detecting the motor rotation angle of the pick-and-place member 323. When it is confirmed according to the container displacement data that the pick-and-place member 323 has transported the container on the bearing portion 321 to the second predetermined position, it is necessary to control the pick-and-place assembly 300 to move downward to the fourth height position.

In one implementation of the present disclosure, when the container is located at the second predetermined position, the edge of the container adjacent to the bearing surface is configured to at least cross the bearing surface edge by a predetermined distance. During returning the container box, the container will move to the second predetermined position at a certain moment in the process of moving closer to the bearing surface of the carrier 5 or the temporary storage tray 21. In an embodiment, when the container is located at the second predetermined position, the edge of the container near the bearing surface is configured not to fall on the bearing surface, or the edge of the container far from the bearing surface is configured not to fall on the bearing surface.

That is to say, the container in the second predetermined position has not been completely transported to the bearing surface of the carrier 5 or the temporary storage tray 21. When the bearing portion 321 is at the third height position higher than the bearing surface, if the container is completely transported to the bearing surface, the bearing surface will bear a large gravity impact. Therefore, when the container is not completely transported to the bearing surface, that is, when it moves to the second predetermined position, it is necessary to lower the pick-and-place assembly 300 to the height of the fourth position, so as to avoid the above-mentioned gravity impact. The container at the second predetermined position has passed the edge of the bearing surface, so properly lowering the pick-and-place assembly 300 at this time will not cause the container stuck by the edge of the carrier 5 or the temporary storage tray 21 and the failure of picking up the container.

In one implementation of the present disclosure, at the fourth height position, the bearing portion 321 is higher than the bearing surface, and the height difference between the bearing portion 321 and the bearing surface at the fourth height position is smaller than the height difference between the bearing portion 321 and the bearing surface at the third height position; or, at the fourth height position, the bearing portion 321 is flush with or lower than the bearing surface. When the container is transported to the second predetermined position by the pick-and-place member 323, the pick-and-place assembly 300 can be lowered to the fourth height position. The bearing portion 321 at the fourth height position can still be higher than the bearing surface, but the bearing portion 321 at the fourth height position is closer to the bearing surface than the bearing portion 321 at the third height position, thus reducing the impact of the container on the bearing surface. The bearing portion 321 at the fourth height can also be flush with or lower than the bearing surface, so that the gravity impact of the container on the bearing surface can be eliminated. The fourth height position can not be too much lower than the bearing surface, but only slightly lower than the bearing surface. If the fourth height position is much lower than the bearing surface, it may cause the container to fall over and the failure of returning the container.

When the pick-and-place assembly 300 moves between the third height position and the fourth height position, the auxiliary support device 400 is configured to remain in the extended position. The abutting portion 42 of the auxiliary support device 400 can be movably matched with the carrier 5, so it can still support in the extended position when the pick-and-place assembly 300 is ascending and descending. This can ensure that the pick-and-place assembly 300 can be stably supported when moving between the third height position and the fourth height position, thereby improving the stability of the transfer robot.

The auxiliary support device 400 can extend out to the extended position for supporting after the pick-and-place assembly 300 moves to the third height position, or extend out for supporting after the pick-and-place assembly 300 ascends and descends to the preset height position. During the fine adjustment of the pick-and-place assembly 300 from the preset height position to the third height position, the auxiliary support device 400 can be maintained in the extended position to provide stable support for the transfer robot. In the process of ascending and descending to adjust the height of the pick-and-place assembly, the abutting portion 42 is slidably fit with the carrier 5, so that the auxiliary support device 400 will not scratch the surface of the carrier and the abutting portion 42 will not be worn.

In one implementation of the present disclosure, referring to FIG. 10, the carrier 5 may have a first depth position 51 and a second depth position 52. The first depth position 51 is the storage position near the roadway side, and the second depth position 52 is the storage position away from the roadway side. The transfer robot located in the roadway can take and place containers located at the first depth position 51 and the second depth position 52 in the first direction and the opposite direction. With respect to the transfer robot, the container located at the first depth position 51 is the outer container box, and the container located at the second depth position 52 is the inner container box. The pick-and-place member 323 can be extended out to the second depth position 52 to retrieve the inner container box. When returning the inner container box, the inner container box may be blocked by the outer container box. At this time, it is necessary to transport the corresponding outer container box to the temporary storage tray 21 for temporary storage, and then transport the outer container box back to its original position after the inner container box is transported to the second depth position.

In an embodiment, when the transfer robot receives an instruction and needs to take out the inner container box blocked by the outer container box, the handling process can be subdivided into six times of taking and returning the container as follows.

1) Take out the outer container box. The pick-and-place assembly 300 moves to the first height position slightly lower than the bearing surface of the first depth position 51 of the carrier 5. After the pick-and-place member 323 transports the outer container box to the first predetermined position towards the bearing portion 321, the pick-and-place assembly 300 moves upward to the second height position, so that the pick-and-place member 323 can completely take the outer container box to the bearing portion 321.

2) Temporarily store the outer container box. The pick-and-place mechanism 32 rotates relative to the base to align the pick-and-place member 323 with the direction of the temporary storage tray 21; and the pick-and-place assembly 300 moves to the third height position slightly higher than the bearing surface of a vacant temporary storage tray 21, after the pick-and-place member 323 transports the outer container box to the second predetermined position towards the temporary storage tray 21, the pick-and-place assembly 300 moves downward to the fourth height position, so that the pick-and-place member 323 can completely transport the outer container box to the temporary storage tray 21.
3) Take out the inner container box. The pick-and-place mechanism 32 rotates relative to the base, so that the pick-and-place member 323 is aligned with the direction of the target carrier 5; and the pick-and-place assembly 300 moves to the first height position slightly lower than the bearing surface of the first depth position 51 of the carrier 5, and after the pick-and-place member 323 transports the inner container box to the first predetermined position towards the bearing portion 321, the pick-and-place assembly 300 moves upward to the second height position, so that the pick-and-place member 323 can completely pick up the inner container box to the bearing portion 321.
4) Temporarily store the inner container box. The pick-and-place mechanism 32 rotates relative to the base to align the pick-and-place member 323 with the direction of the temporary storage tray 21; The pick-and-place assembly 300 moves to the fifth height position slightly higher than the bearing surface of another vacant temporary storage tray 21, and after the pick-and-place member 323 transports the inner container box to the second predetermined position towards the temporary storage tray 21, the pick-and-place assembly 300 moves downward to the sixth height position, so that the pick-and-place member 323 can completely transport the inner container box to the temporary storage tray 21.
5) Retrieve the outer container box. When the pick-and-place assembly 300 moves to a third height position slightly lower than the bearing surface of the temporary storage tray 21 temporarily storing the outer container box, and after the pick-and-place member 323 transports the outer container box to the first predetermined position towards the bearing portion 321, the pick-and-place assembly 300 moves upward to the fourth height position, so that the pick-and-place member 323 completely transports the outer container box to the bearing portion 321.
6) Put back the outer container box. The pick-and-place mechanism 32 rotates relative to the base, so that the pick-and-place member 323 is aligned with the direction of the target carrier 5; The pick-and-place assembly 300 moves to the seventh height position slightly higher than the bearing surface of the carrier 5 corresponding to the first depth position 51 of the outer container box, and after the pick-and-place member 323 transports the outer container box to the second predetermined position towards the first depth position 51, the pick-and-place assembly 300 moves downward to the eighth height position, so that the pick-and-place member 323 places the outer container box on the bearing surface of the second depth position 52.

After the six times of taking and returning the container, the inner container box located at the second depth position 52 is taken out in the case of being blocked by the outer container box. In order to return the container box to the second depth position 52 in the case of that the first depth position 51 is blocked by the outer container box, it is necessary to carry out six times of taking and returning the container in sequence, which is taking out the outer container box, temporarily storing the outer container box, taking out the inner container box from the temporary storage tray 21, storing the inner container box in the second depth position 52, retrieving the outer container box and storing the outer container box in the first depth position 51. The specific method will not be described here.

In the process of taking and returning the inner container box, the height changes of the pick-and-place assembly 300 are involved for many times, if only the fine height adjustments are involved, the auxiliary support device 400 can be held in the extended position for supporting; If significant height changes are involved, the auxiliary support device 400 needs to be retracted from the extended position to the retracted position before height adjustment. In an embodiment, the fine height adjustment refers to the adjustment of height during one transportation, or the situation that a temporary storage tray 21 is located at the same height as the bearing surface of the carrier 5. The obvious height change means that the pick-and-place assembly 300 needs to move to other temporary storage trays 21 with different heights from the bearing surface of the carrier 5. The abutting portion 42 of the auxiliary support device 400 is actually configured to be supported on the cross beam of the carrier 5. When the pick-and-place assembly 300 changes significantly in height, the abutting portion 42 moves along to the position out of supporting, therefore, it is necessary to retract the auxiliary support device 400 to the retracted position before the obvious height adjustment. In the case of fine adjustment of height, the auxiliary support device 400 can be kept in the extended position to provide stable support for the transfer robot.

Embodiment 3

Compared with the second embodiment, the main difference in an embodiment with the second embodiment is that the abutting portion 42 of the auxiliary support device and the carrier 5 in an embodiment are in a different way of sliding fit. In order to ensure the simplicity of the text, the difference will be explained in detail with the attached drawings. Other structures and motion modes of the transfer robot are completely the same as those of the transfer robot provided in the first embodiment, and will not be described here.

In the second embodiment, the way to realize the sliding fit between the abutting portion 42 and the carrier 5 is that the part of the abutting portion 42 contacting with the carrier 5 is made of self-lubricating material. However, an embodiment does not need to limit the material of the abutting portion 42, but provides a brand-new structure of the abutting portion 42, so as to realize the above sliding fit.

Figure 15:
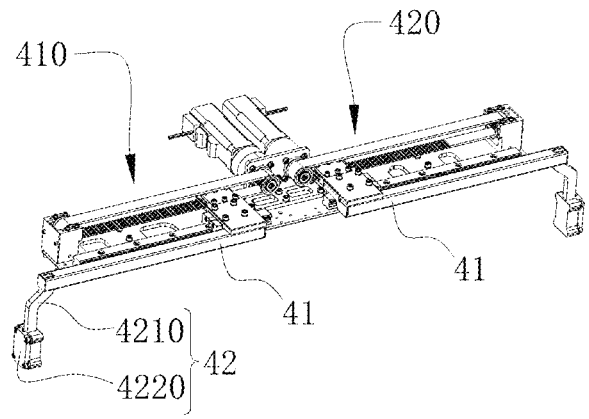
FIG. 15 is a structural schematic diagram of an auxiliary support device in a third embodiment of the present disclosure.

Referring to FIG. 15, the abutting portion 42 includes a fixed portion and a sliding portion, and the sliding portion is configured to be slidably connected to the fixed portion. When in the extended position, the sliding portion abuts against the carrier 5; and when the pick-and-place assembly 300 drives the auxiliary support device 400 to ascend or descend along the gantry assembly 2, the sliding portion is configured to slide relative to the fixed portion.

In one implementation of the present disclosure, the sliding portion may be a slider 4220 and the fixed portion may be a slide rod 4210. The abutting portion 42 includes a slide rod 4210 and a slider 4220, and the slider 4220 is configured to be slidably connected to the slide rod 4210. When in the extended position, the slider 4220 abuts against the carrier 5. When the pick-and-place assembly 300 drives the auxiliary support device 400 to ascend or descend along the gantry assembly 2, the slider 4220 is configured to slide relative to the slide rod 4210. The slide rod 4210 may be configured to extend upward from the support portion 41 to a position partially overlapping with the pick-and-place mechanism 32 in the height direction of the pick-and-place mechanism, and the slider 4220 may be sleeved on the slide rod 4210.

The slider 4220 and the slide rod 4210 are configured as in a sliding fit. In order to ensure the smoothness of sliding, the slide rod 4210 and the inner wall of the slider 4220 in contact with the slide rod 4210 cannot be constructed of materials with too rough surface or too large friction coefficient. The slide rod 4210 and slider 4220 can be made of common smooth materials such as metal, resin and plastic.

Figure 17:
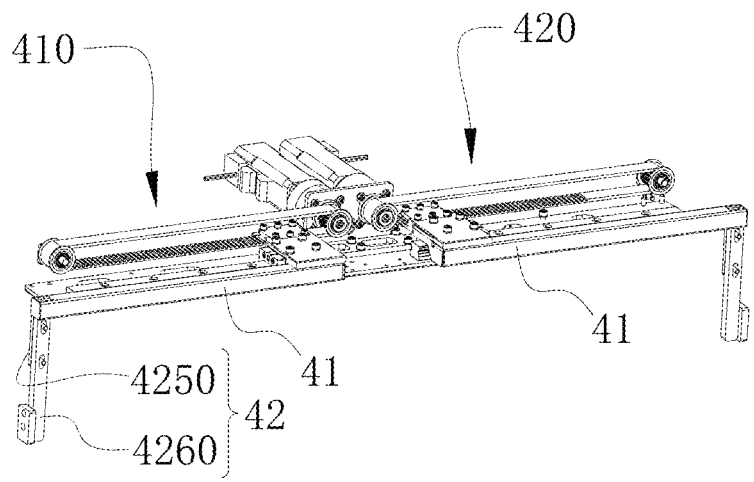
FIG. 17 is a schematic structural diagram of an auxiliary support device according to another implementation in a third embodiment of the present disclosure.

In another implementation of the present disclosure, referring to FIG. 17, the sliding portion can also be a moving rod 4260, and the fixed portion can also be a fixed seat 4250. The abutting portion 42 includes the fixed seat 4250 and the moving rod 4260, and the moving rod 4260 is configured to be slidably connected to the fixed seat 4250. When in the extended position, the protruding position of the side wall of the moving rod 4260 abuts against the carrier 5. When the pick-and-place assembly 300 drives the auxiliary support device 400 to ascend or descend along the gantry assembly 2, the moving rod 4260 is configured to slide relative to the fixed seat 4250. The moving rod 4260 can be configured to extend upward from the support portion 41 to a position partially overlapping with the pick-and-place mechanism 32 in the height direction, and the fixed seat 4250 can also extend upward from the support portion 41, and the extension length of the moving rod 4260 is longer than that of the fixed seat 4250. The fixed seat 4250 can be provided with the fixed rod, as shown in FIG. 10, two fixed rods are provided in this implementation; and the moving rod 4260 may be provided with two curve-shaped holes corresponding to the fixed rods. The two curve-shaped holes are respectively movably sleeved on the fixed rod, so that the moving rod 4260 is slidably connected to the fixed seat 4250.

The movable rod 4260 and the fixed seat 4250 are constructed as in a sliding fit. In order to ensure the smoothness of sliding, the fixed rod of the fixed seat 4250 and the inner wall of the curve-shaped hole of the movable rod 4260 cannot be constructed of materials with too rough surface or too large friction coefficient. The moving rod 4260 and the fixed seat 4250 can be made of common smooth materials such as metal, resin and plastic.

In an embodiment, the sliding fit structure in which the abutting portion 42 is constructed as a fixed portion and a sliding portion will not affect the supporting function of the auxiliary support device 400 at all, and the structural arrangement of the fixed portion and the sliding portion can effectively reduce the friction force in the vertical direction. When the pick-and-place assembly 300 drives the auxiliary support device 400 to ascend or descend along the gantry assembly 2, the abutting portion 42 in the extended position can be kept relatively static in the abutting position with the surface of the carrier 5, and no friction will occur between the abutting portion 42 and the carrier 5. In this way, the surface of the carrier 5 can be protected from being scratched, and at the same time, the ascending or descending resistance of the pick-and-place assembly 300 can be reduced.

Embodiment 4

Compared with the second and third embodiments, the main difference of the fourth embodiment is in that the abutting portion 42 of the auxiliary support device and the carrier 5 are in a different way of sliding fit. In order to ensure the brevity of the text, this difference will be explained in detail with the attached drawings. Other structures and motion modes of the transfer robot are completely the same as those of the transfer robot provided in Embodiment 1, and will not be described here.

Figure 16:
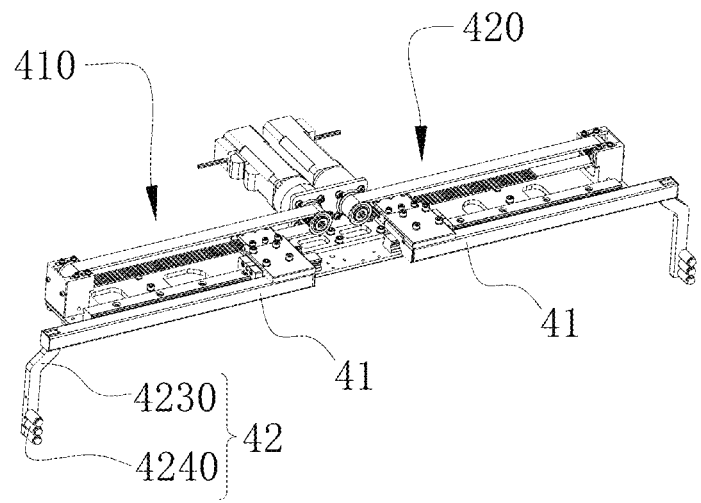
FIG. 16 is a structural schematic diagram of an auxiliary support device in a fourth embodiment of the present disclosure.

Referring to FIG. 16, the abutting portion 42 includes a bracket 4230 and a rolling portion 4240 rotatably connected to the bracket 4230. When in the extended position, the rolling portion 4240 is configured to abut against the carrier 5 and be in a rolling fit with the carrier 5 during the moving process. The bracket 4230 may be configured to extend upward from the support portion 41 to a position partially overlapping with the pick-and-place mechanism 32 in the height direction, and the rolling portion 4240 may be rotatably connected to the free end of the bracket 4230.

When in the extended position, the rolling portion 4240 can abut on the surface of the carrier 5, and constructing the abutting portion 42 as a rolling fit structure of the bracket 4230 and the rolling portion 4240 will not affect the auxiliary support device 400 to realize the supporting function at all. The structure of the bracket 4230 and the rolling portion 4240 can effectively reduce the friction in the vertical direction. When the pick-and-place assembly 300 drives the auxiliary support device 400 to ascend or descend along the gantry assembly 2, the abutting portion 42 at the extended position can be in rolling fit with the surface of the carrier 5, and the friction between the rolling portion 4240 on the abutting portion 42 and the carrier 5 is very small. In this way, the surface of the carrier 5 can be protected from being scratched, and at the same time, the ascending or descending resistance of the pick-and-place assembly 300 can be reduced.

Embodiment 5

Referring to FIG. 8, an embodiment provides a transfer robot, which includes a chassis assembly 100, a gantry assembly 2, a pick-and-place assembly 300 and an auxiliary support device 400. The gantry assembly 2 is arranged on the chassis assembly 100; and the pick-and-place assembly 300 is configured to ascend or descend along the gantry assembly 2 to pick and place containers at different heights.

The auxiliary support device 400 is disposed on the pick-and-place assembly 300 and is configured to be able to extend outward to abut against the carrier 5. The pick-and-place assembly 300 is configured to move to different height positions along the height direction during the pick-and-place process of a single container, and the auxiliary support device 400 is configured to abut against and be slidably fit with the carrier 5 as the pick-and-place assembly 300 ascends or descends along the gantry assembly 2.

In an embodiment, the auxiliary support device 400 is configured to abut against and be slidably fit with the carrier 5 in the process of the pick-and-place assembly 300 ascending or descending the gantry assembly 2, so that it is not necessary to put away the auxiliary support device 400 300 when the pick-and-place assembly adjusts its height, and the auxiliary support device 400 can always be kept in the supporting position, providing a supporting function, and improving the stability of the pick-and-place assembly 300 when adjusting its height. In the process of adjusting the height of the pick-and-place assembly 300, the friction between the auxiliary support device 400 and the carrier 5 is very small, which can protect the surface of the carrier 5 from being scratched and reduce the resistance of the pick-and-place assembly 300 to lift.

In an embodiment, the chassis assembly 100, the gantry assembly 2, the pick-and-place assembly 300, and the auxiliary support device 400 of the transfer robot are completely the same as those of the transfer robot disclosed in the second embodiment. In an embodiment, the auxiliary support device 400 can abut against and be slidably fit with the carrier 5, and the sliding fit structure can be any one of the sliding fit modes in the second to fourth embodiments, which will not be repeated here.

Embodiment 6

An embodiment provides a storage system, which includes a storage area and a transfer robot. The storage area is provided with a plurality of carriers 5, and two adjacent carriers 5 define a roadway. The transfer robot is the transfer robot provided in the above first to fifth embodiments.

In an embodiment, the transfer robot constructs the auxiliary support device 400 to always abut against and be slidably fit with the carrier 5 in the process of the pick-and-place assembly 300 ascending or descending along the gantry assembly 2, so as to realize that the auxiliary support device 400 does not need to be put away when the pick-and-place assembly 300 is adjusting its height, and can always be kept in a supporting position, providing a supporting function, and improving the stability of the pick-and-place assembly 300 when adjusting its height. In the process of adjusting the height of the pick-and-place assembly 300, the friction between the auxiliary support device 400 and the carrier 5 is very small, which can protect the surface of the carrier 5 from being scratched and reduce the resistance of the pick-and-place assembly 300 to ascend and descend.

In an embodiment, the specific structures and the moving modes of the chassis assembly 100, the gantry assembly 2, the pick-and-place assembly 300, and the auxiliary support device 400 of the transfer robot are completely the same as those of the transfer robot disclosed in the second embodiment. In an embodiment, the auxiliary support device 400 can abut against and be slidably fit with the carrier 5, and the sliding fit structure can be any one of the above three embodiments, which will not be repeated here.

Embodiment 7

An embodiment provides a container pick-and-place method, which is applied to a transfer robot, and the transfer robot includes a pick-and-place mechanism, and the method includes the following steps:

The transfer robot determines a target container in response to a container pick-and-place instruction, and moves to a target storage position corresponding to the target container;

The pick-and-place mechanism is controlled to move to a first position, and starts to pick and place the target container in the first position, and the first position has a preset height difference with respect to the target storage position;

In a case that the current position is at a preset position, the pick-and-place mechanism is adjusted to a second position, and the pick-and-place mechanism is controlled to pick and place the target container in the second position until completing picking and placing the container, and the second position has a target height difference with respect to the target storage position.

In an embodiment, in the process of carrying out the task of taking out the container, the robot can first determine the position of the target container in response to the instruction of picking the container and move to the target storage position corresponding to the target container. Then, the pick-and-place mechanism can move to the first position, which is the first height position in the second embodiment. There is the preset height difference between the first position and the target storage position, in an embodiment, the first height position is slightly lower than the target storage position, thus ensuring the smooth process of taking out the container and high success rate. When the pick-and-place mechanism takes the container to the preset position, the pick-and-place mechanism is adjusted to the second position, which is the second height position in the second embodiment. There is the target height difference between the second position and the target storage position. In an embodiment, the second height position is higher than the first height position, and the pick-and-place mechanism can be raised to a position slightly higher than the target storage position or still slightly lower than the target storage position. The pick-and-place mechanism takes out the target container at the second height position until completing taking out the container.

In the process of carrying out the task of storing containers, the robot can first determine the position of the target container in response to the instruction of storing containers and move to the target storage position corresponding to the target container. Then, the pick-and-place mechanism can move to the first position, which is the third height position in the second embodiment. There is the preset height difference between the first position and the target storage position, in an embodiment, the third height position is slightly higher than the target storage position, thus ensuring the smooth process of storing containers and high success rate. When the container is transported to the preset position by the pick-and-place mechanism, the pick-and-place mechanism is adjusted to the second position, which is the fourth height position in the second embodiment. There is the target height difference between the second position and the target storage position. In an embodiment, the fourth height position is lower than the third height position, and the pick-and-place mechanism can be lowered to a position slightly lower than the target storage position or still slightly higher than the target storage position. The pick-and-place mechanism takes out the target container at the fourth height position until completing taking out the container.

According to the present disclosure, the height of the pick-and-place mechanism can be adjusted in the process of picking and placing containers, and the height difference between the pick-and-place mechanism and the target storage position can be reduced, so as to reduce the vibration caused by the container colliding with the carrier of containers.

The terminology related to one or more embodiments of the present application is explained as follows.

Bin robot refers to a storage robot with a bin as its operating unit.

In the actual application scenario, picking and placing bin are usually completed by the bin robot. When the bin robot performs the task, it often needs to take the container from the shelf to its own fork, or put the bin back on the shelf from the fork. Because there is a gap between the fork and the shelf, considering the deformation of the bin or the deformation of the shelf, a certain height difference will be kept between the shelf and the fork when moving the bin, so as to ensure that the bin can move between the shelf and the fork. Generally speaking, the original position of the bin is slightly higher than the target position, so when taking the bin from the shelf, the height of the fork is lower than the height of the shelf; and when putting the container box on the shelf, the height of the fork is higher than that of the shelf.

When the bin is moved from the high position to the low position, due to the height difference, when the rear part of the bin is completely separated from the original device, the weight of the bin will all be pressed on the receiving device, which will bring great noise and vibration, and the vibration of the shelf will be transmitted to the adjacent bins. The accumulation of vibration may make the position and angle of the adjacent bins deviate, resulting in the subsequent failure to take the bins out normally.

In an embodiment, a container pick-and-place method is provided, and the application also relates to a container pick-and-place device, a computing apparatus and a computer-readable storage medium, which are described in detail in the following examples sequentially.

Figure 18:
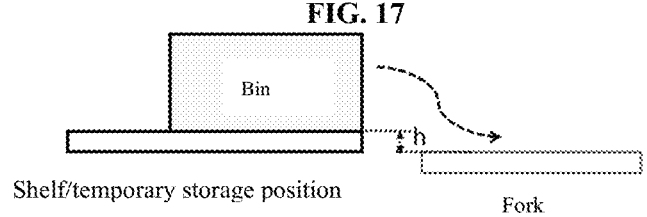
FIG. 18 is an application scenario diagram of a container pick-and-place method provided by an embodiment of the present application.
Figure 18:
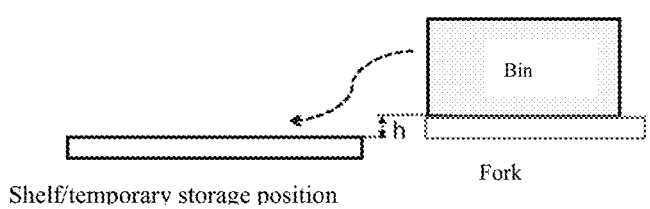

Referring to FIG. 18, FIG. 18 shows an application scenario diagram of a container pick-and-place method provided according to an embodiment of the present application. Taking a storage scene as an example, a container pick-and-place method provided by an embodiment of the present application is explained with reference to FIG. 18. In this storage scene, the transfer robot is the bin robot, the pick-and-place mechanism is the fork, the target container is the bin, and the target storage position is the storage position on the shelf corresponding to the container or a temporary storage position.

In an embodiment, when receiving the task of picking and placing bins, the bin robot first needs to determine the bin to be picked and placed, and moves to the shelf corresponding to the bin. During the task of picking up the bin, the bin robot controls the fork of the bin robot to be lowered from the height of the storage position corresponding to the bin or temporary storage position to the first position (that is, the height of the fork in the process of picking up the bin shown in FIG. 18) according to the preset height (that is, h shown in FIG. 18), and controls the fork to move the bin from the storage position or temporary storage position to the fork at the first position. During the movement, the bin robot can use its own image acquisition apparatus to perform image acquisition on the bin to determine the position of bin during the movement. If it is determined that the front end of the bin has entered the fork, at this time, in order to reduce the vibration caused by the height difference between the shelf and the fork, the bin robot can raise the height of the fork to reduce the height difference between the shelf and the fork until the height difference between the fork and the shelf is very small or the height of the fork is slightly higher than the height of the shelf, and then stop ascending the fork.

In the process of ascending the height of the fork, the bin can be continuously moved to the fork, or the bin can be continuously moved to the fork after stopping ascending the height of the fork. When the bin is completely moved to the fork, the task of taking out the bin is completed.

During the process of returning the bin, the bin robot controls the fork of the bin robot to ascend from the height of the corresponding storage position or temporary storage position of the container to the first position (that is, the height of the fork in the process of returning the bin shown in FIG. 18) according to the preset height (that is, h shown in FIG. 18), and controls the fork to move the bin from the fork to the storage position or temporary storage position at the first position. During the movement, the bin robot can also use its own image acquisition apparatus to perform image acquisition on the bin to determine the position of bin during the movement. If it is determined that the front end of the bin has entered the storage position or the temporary storage position, at this time, in order to reduce the vibration caused by the height difference between the shelf and the fork, the bin robot can lower the height of the fork to reduce the height difference between the shelf and the fork, and stop lowering the fork until the height difference between the fork and the shelf is very small, or the height of the fork is slightly lower than the height of the shelf.

In the process of reducing the height of the fork, the bin can be continuously moved to the shelf, or the bin can be continuously moved to the shelf after stopping reducing the height of the fork. When the bin is completely moved to the shelf, the task of returning the bin is completed.

The container pick-and-place method provided by the present disclosure can detect the position of the container in real time in the process of moving the container from a high position to a low position, so as to adjust the height of the pick-and-place mechanism according to the position of the container and reduce the height difference between the pick-and-place mechanism and the target storage position, thereby reducing the vibration caused by the collision of the container with the carrier of containers due to the height difference between the pick-and-place mechanism and the target storage position.

Figure 19:
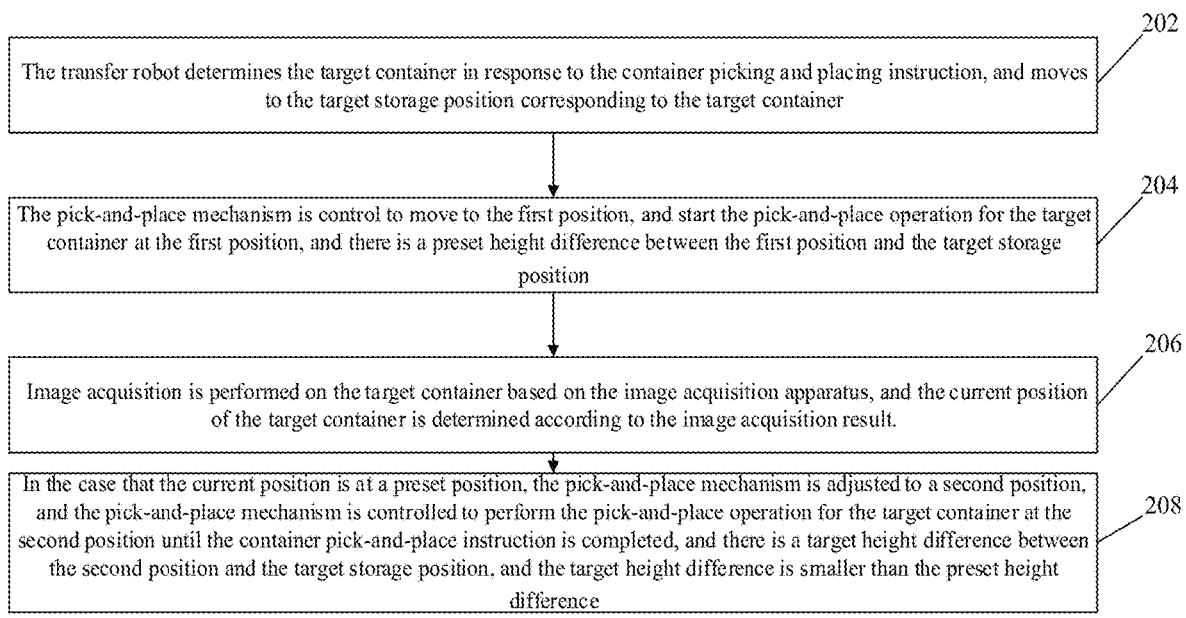
FIG. 19 is a flow chart of a container pick-and-place method provided by an embodiment of the present application.

FIG. 19 shows a flowchart of a container pick-and-place method according to an embodiment of the present application, which is applied to a transfer robot, and the transfer robot includes a pick-and-place mechanism and an image acquisition apparatus, and, in an embodiment, includes the following steps.

At Step 202, the transfer robot determines the target container in response to the container pick-and-place instruction, and moves to the target storage position corresponding to the target container.

In practical application, whether when the goods are out of the warehouse, into the warehouse, or in the inventory of goods, etc., it will involve the storage or picking out of the bin containers. When carrying out the task of organizing the bin containers, the bin robot usually performs the corresponding task of organizing the containers.

The transfer robot refers to the intelligent mobile apparatus that performs the task of storing or taking out containers. The transfer robot can be a bin robot or other intelligent mobile apparatus that can pick and place containers.

Container pick-and-place instruction refers to the instruction used to carry out picking and placing containers, including container storage instruction and container take-out instruction. The container storage instruction refers to the operation instruction to store the container in the corresponding storage position; and the container take-out instruction refers to the operation instruction to take out the container from the corresponding target storage position.

The target container refers to the container that needs to be picked and placed. The target container can be an inventory container, that is, a container located in an inventory area for storing goods; it can be an order container, that is, a container located in the sowing wall for storing the goods designated by the order; it can be a temporary storage container, that is, a container for temporarily storing goods taken out of the shelf, etc. The specific type of the target container needs to be determined according to the actual application business scenario. For example, if the business scenario is a goods picking scenario, the target container can be an order container or an inventory container.

The target storage position refers to the storage position used to store the target container. Corresponding to the target container, if the target container is an inventory container, the target storage position is a storage position on the shelf or a temporary storage position for storing the inventory container; if the target container is an order container, the target storage position is a storage position on the seeding wall for storing the container of the order; if the target container is a temporary storage container, the target storage position is a temporary storage position on a temporary storage shelf for temporarily storing the temporary storage container.

In an embodiment, after receiving the container pick-and-place instruction, the transfer robot needs to determine the target container that needs to be picked and placed according to the container pick-and-place instruction, and move to the target storage position corresponding to the target container, so that picking and placing can be performed on the target container according to the container pick-and-place instruction.

In an embodiment provided by the application, the transfer robot determines a target container in response to a container pick-and-place instruction, and moves to a target storage position corresponding to the target container, which including the following steps.

The transfer robot determines the target container and the target storage position corresponding to the target container in response to a container pick-and-place instruction, and moves to a carrier of the target container corresponding to the target storage position; and the pick-and-place mechanism is controlled to move to the initial position corresponding to the target storage position.

The carrier of the target container refers to a shelf, a temporary storage shelf or a seeding wall corresponding to the target storage position. The initial position refers to the operation position corresponding to the target storage position, and the height of the initial position is the same as or slightly different from that of the target storage position.

In an embodiment, after receiving the container pick-and-place instruction, the transfer robot responds to the container pick-and-place instruction to determine the target container to be picked and placed and the target storage position corresponding to the target container, then moves to the carrier of the target container corresponding to the target storage position, and controls the pick-and-place mechanism to move to the initial position corresponding to the target storage position.

The description is given taking the transfer robot as a bin robot and the target container as a bin stored on the shelf in the inventory area as an example. The bin robot receives the container pick-and-place instruction, determines the bin that needs to be picked and placed and the storage position for storing the bin according to the container pick-and-place instruction, and then moves to the shelf corresponding to the storage position, and controls the fork to move to the initial position corresponding to the storage position, so as to execute the subsequently picking and placing the bin.

The container pick-and-place method provided by the application is applied to a transfer robot, and the transfer robot determines a target container and a target storage position corresponding to the target container by receiving a container pick-and-place instruction, and then moves to an initial position corresponding to the target storage position, so that subsequently picking and placing the target container are performed.

At step 204, the pick-and-place mechanism is control to move to the first position, and starts to pick and place the target container at the first position, and there is a preset height difference between the first position and the target storage position.

The first position refers to the height of the position where the pick-and-place mechanism picks and places the target container based on the preset height difference. The preset height difference refers to the difference between the preset height of the first position and the height of the target storage position, and the preset height difference can be positive or negative numbers. If the preset height difference is positive number, it means that the height of the first position is higher than the height of the target storage position; and if the preset height difference is negative, it means that the height of the first position is lower than the height of the target storage position.

In practical application, the height of the first position is determined according to different container picking and placing scenes. For example, for the container storage scene, in order to make the container be stored to the corresponding storage position smoothly, the height of the first position can be made higher than the height of the storage position; and for the container taking-out scenario, the height of the first position can be made lower than the height of the storage position.

In an embodiment provided by the application, the container pick-and-place instruction includes a container storing instruction.

Controlling the pick-and-place mechanism to move to the first position includes: obtaining a preset height difference; and determining a first position according to the preset height difference and the initial position, and controlling the pick-and-place mechanism to ascend from the initial position to the first position.

In an embodiment, when the container pick-and-place instruction is the container storage instruction, that is, the transfer robot needs to respond to the container storage instruction and store the target container from the pick-and-place mechanism to the corresponding target storage position. After the transfer robot moves to the initial position corresponding to the target storage position in response to the container storage instruction, it needs to obtain the preset height difference and control the pick-and-place mechanism to ascend from the initial position to the first position according to the preset height difference, so that the pick-and-place mechanism can smoothly push the target container to the target storage position.

After the pick-and-place mechanism ascends to the first position, the pick-and-place mechanism can be controlled to store the target container at the first position, that is, the target container is pushed to the target storage position corresponding to the target container at the first position.

In an embodiment provided by the application, picking and placing the target container at the first position, includes: controlling the pick-and-place mechanism in the first position, and moving the target container from the pick-and-place mechanism to the target storage position.

After the transfer robot controls the pick-and-place mechanism to ascend to the first position, it can control the pick-and-place mechanism to move the target container from the pick-and-place mechanism to the target storage position.

When the pick-and-place mechanism moves the target container from the pick-and-place mechanism to the target storage position at the first position, it does not directly move the target container to the target storage position completely.

Accordingly, in the application scenario of taking out the container, the container pick-and-place instruction is the container take-out instruction, and the implementation method is as follows.

In another embodiment provided by the application, the container pick-and-place instruction includes a container taking-out instruction; and controlling the pick-and-place mechanism to move to the first position includes obtaining a preset height difference and determining a first position according to the preset height difference and the initial position, and controlling the pick-and-place mechanism to descend from the initial position to the first position.

In an embodiment, when the container pick-and-place instruction is a container take-out instruction, that is, the transfer robot needs to take out the target container from the target storage position and put it in the pick-and-place mechanism in response to the container take-out instruction. After the transfer robot moves to the initial position corresponding to the target storage position in response to the container taking-out instruction, it needs to obtain the preset height difference and control the pick-and-place mechanism to descend from the initial position to the first position according to the preset height difference, so that the pick-and-place mechanism can successfully take out the target container from the target storage position.

After the pick-and-place mechanism is lowered to the first position, the pick-and-place mechanism can be controlled to take out the target container at the first position, that is, the target container is taken out from the target storage position corresponding to the target container at the first position and placed in the pick-and-place mechanism.

Correspondingly, in another embodiment provided by the application, picking and placing the target container at the first position includes: controlling the pick-and-place mechanism in the first position, and moving the target container from the target storage position to the pick-and-place mechanism.

After the transfer robot controls the pick-and-place mechanism to descend to the first position, it can control the pick-and-place mechanism to move the target container from the target storage position to the pick-and-place mechanism.

In the process of the pick-and-place mechanism moving the target container from the target storage position to the pick-and-place mechanism at the first position, the target container is not directly move to the pick-and-place mechanism completely.

The container pick-and-place method provided by the application can determine the operating position height to which the pick-and-place mechanism needs to move according to the specific business scene, namely the container storage scene or the container taking-out scene, and start to pick and place the target container at the corresponding operating position height.

At Step 206, image acquisition is performed on the target container based on the image acquisition apparatus, and the current position of the target container is determined according to the image acquisition result.

After the pick-and-place mechanism reaches the first position and starts to pick and place the target container at the first position, it is necessary to detect the position of the target container, and adjust the position of the pick-and-place mechanism according to the position of the target container to reduce the vibration generated by the target container.

The image acquisition apparatus refers to the apparatus with image acquisition function used to acquire the image of the target container in the moving process, for example, a video camera, a panoramic camera, a pinhole camera, a camera, etc. The image acquisition apparatus is installed on the transfer robot.

The image acquisition result refers to the image of the target container in the moving process obtained based on the image acquisition apparatus, and the image acquisition result can include one target container image or multiple target container images.

The current position is the position of the target container based on the image acquisition results obtained by the image acquisition apparatus at the current moment. For example, the camera is used to capture the image of the target container at time t1, and the determined position of the target container based on the image of the target container at time t1 is the current position of the target container.

In an embodiment provided by the application, acquiring an image of the target container based on an image acquisition apparatus and determining the current position of the target container according to the image acquisition result includes: acquiring an image of the target container based on an image acquisition apparatus to obtain a position image of the target container; and determining the current position of the target container according to the position image.

The position image refers to the images of various positions of the target container in the moving process obtained based on the image acquisition apparatus.

In an embodiment, after the transfer robot controls the pick-and-place mechanism to start to pick and place the target container at the first position, the position of the target container can be detected in real time by using the image acquisition apparatus installed in the transfer robot, that is, the image of the target container is acquired based on the image acquisition apparatus, so that one or more position images about the target container can be obtained. According to the position image of the target container, the position of the target container at each moment is determined.

According to the container pick-and-place method provided by the application, the image acquisition of the target container can be realized by using the image acquisition apparatus of the transfer robot, so that the moving position information of the target in the process of picking and placing can be obtained.

At step 208, in the case that the current position is at a preset position, the pick-and-place mechanism is adjusted to a second position, and the pick-and-place mechanism is controlled to pick and place the target container at the second position until completing picking and placing the container, and there is a target height difference between the second position and the target storage position, and the target height difference is smaller than the preset height difference.

The position of the target container is detected by the image acquisition apparatus to determine whether it is necessary to adjust the position height of the pick-and-place mechanism to reduce the preset height difference between the target storage position and the pick-and-place mechanism.

The preset position refers to the target container arrival position preset in the target storage position or the pick-and-place mechanism. The preset position can be a position at one quarter or one third of the target storage position or the pick-and-place mechanism, and the size of the preset position can be set according to the actual application situation, which is not limited in this application.

The second position refers to the height of the position where the pick-and-place mechanism picks and places the target container based on the target height difference. The target height difference refers to the difference between the height of the second position and the height of the target storage position, and the target height difference is smaller than the preset height difference. The target height difference can be positive, negative or zero. If the target height difference is positive, it means that the height of the second position is slightly higher than the height of the target storage position; If the target height difference is negative, it means that the height of the second position is slightly lower than the height of the target storage position; If the target height difference is zero, it means that the height of the second position is the same as the height of the target storage position.

In practical application, the height of the second position is determined according to different container pick-and-place scenes. For example, in the container storage scenario, in order to make the container be successfully stored in the corresponding storage position, the height of the second position can be made the same as that of the target storage position, or slightly lower than that of the storage position; and in the container taking-out scenario, the height of the second position can be made the same as the height of the target storage position, or slightly higher than the height of the storage position.

In an embodiment provided by the application, in the case that the container pick-and-place instruction includes a container storing instruction, the preset position is the preset position corresponding to the target storage position.

In the case that the current position is at a preset position, adjusting the pick-and-place mechanism to a second position and controlling the pick-and-place mechanism to pick and place the target container at the second position includes: controlling the pick-and-place mechanism to descend from the first position to the second position in the case that the current position is at the preset position corresponding to the target storage position; and controlling the pick-and-place mechanism in the second position, and moving the target container from the pick-and-place mechanism to the target storage position.

The preset position corresponding to the target storage position is the arrival position of the target container preset in the target storage position, and the preset position corresponding to the target storage position can be one quarter or one third of the target storage position.

In an embodiment, when the container pick-and-place instruction is a container storage instruction, that is, the transfer robot needs to respond to the container storage instruction and store the target container from the pick-and-place mechanism to the corresponding target storage position. After obtaining the current position of the target container, if the transfer robot determines that the target container has reached the preset position corresponding to the target storage position, for example, when the front end of the target container has entered one third of the target storage position, the transfer robot can control the pick-and-place mechanism to descend from the first position to the second position, and control the pick-and-place mechanism to be in the second position to continue moving the target container from the pick-and-place mechanism to the target storage position.

In an embodiment provided by the application, controlling the pick-and-place mechanism in the second position and moving the target container from the pick-and-place mechanism to the target storage position includes: moving the target container from the pick-and-place mechanism to the target storage position in the process of descending the pick-and-place mechanism from the first position to the second position; or moving the target container from the pick-and-place mechanism to the target storage position after the pick-and-place mechanism descends from the first position to the second position.

In an embodiment, in order to improve the efficiency of container storage, the pick-and-place mechanism can be continuously controlled to move the target container from the pick-and-place mechanism to the target storage position when the transfer robot controls the pick-and-place mechanism to descend from the first position to the second position, until the target container completely enters the target storage position, and the container storage task is completed.

In order to reduce the height difference (i.e. the target height difference) between the target storage position and the second position more accurately, it is also possible to control the pick-and-place mechanism to move the target container from the pick-and-place mechanism to the target storage position after the transfer robot controls the pick-and-place mechanism to descend from the first position to the second position until the target container completely enters the target storage position, and the container storage task is completed.

Accordingly, in the application scenario of taking out the container, the container pick-and-place instruction is the container take-out instruction, and the implementation method is as follows.

In another embodiment provided by the application, in the case that the container pick-and-place instruction includes a container take-out instruction, the preset position is the preset position corresponding to the pick-and-place mechanism.

In the case that the current position is at a preset position, adjusting the pick-and-place mechanism to a second position and controlling the pick-and-place mechanism to pick and place the target container at the second position includes: controlling the pick-and-place mechanism to ascend from the first position to a second position in the case that the current position is located at a preset position corresponding to the pick-and-place mechanism; and controlling the pick-and-place mechanism in the second position, and moving the target container from the target storage position to the pick-and-place mechanism.

The preset position corresponding to the pick-and-place mechanism is the arrival position of the target container preset in the pick-and-place mechanism, and the preset position corresponding to the pick-and-place mechanism can be one quarter or one third of the pick-and-place mechanism.

In an embodiment, when the container pick-and-place instruction is a container take-out instruction, that is, the transport robot needs to take out the target container from the target storage position in response to the container take-out instruction and put it in the pick-and-place mechanism. After obtaining the current position of the target container, if the transfer robot determines that the target container has reached the preset position corresponding to the pick-and-place mechanism, for example, when the front end of the target container has entered one quarter of the pick-and-place mechanism, the transfer robot can control the pick-and-place mechanism to be raised from the first position to the second position, and control the pick-and-place mechanism to be in the second position to continue moving the target container from the target storage position to the pick-and-place mechanism.

In another embodiment provided by the application, controlling the pick-and-place mechanism in the second position and moving the target container from the target storage position to the pick-and-place mechanism includes: moving the target container from the target storage position to the pick-and-place mechanism during the ascending of the pick-and-place mechanism from the first position to the second position; or moving the target container from the target storage position to the pick-and-place mechanism after the pick-and-place mechanism is ascended from the first position to the second position.

In an embodiment, in order to improve the efficiency of container taking-out, the picking-and-placing mechanism can be continuously controlled to move the target container from the target storage position to the picking-and-placing mechanism during the process that the transfer robot controls the picking-and-placing mechanism to ascend from the first position to the second position until the target container completely enters the picking-and-placing mechanism, and the container taking-out task is completed.

In order to reduce the height difference (that is, the target height difference) between the target storage position and the second position more accurately, it is also possible to continue to control the pick-and-place mechanism to move the target container from the target storage position to the pick-and-place mechanism after the transfer robot controls the pick-and-place mechanism to ascend from the first position to the second position until the target container completely enters the pick-and-place mechanism, and the container taking-out task is completed.

Figure 20:
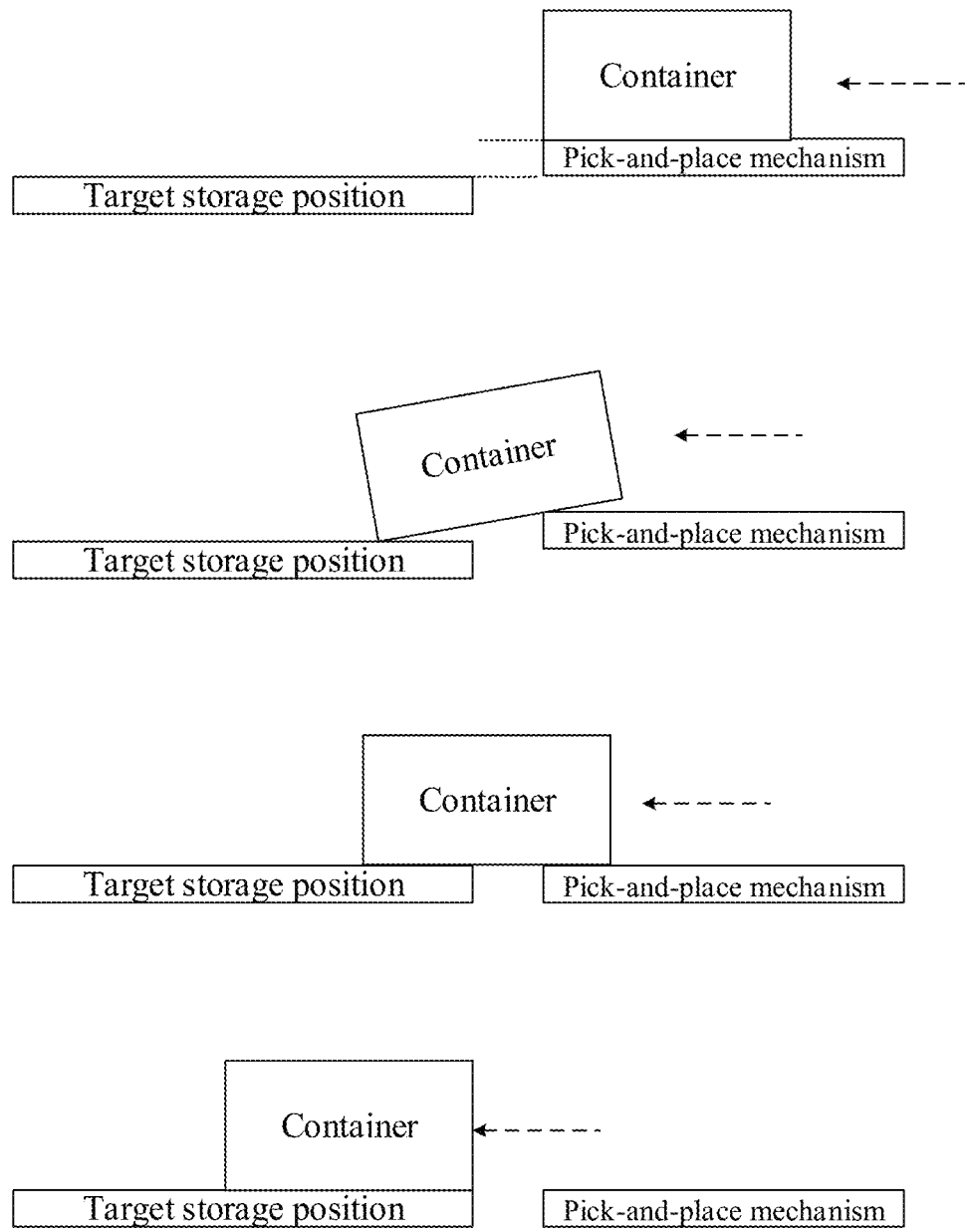
FIG. 20 is a schematic scene processing diagram of a container pick-and-place method provided by an embodiment of the present application.

The container pick-and-place method in an embodiment will be explained with reference to FIG. 20, which shows a schematic scene processing diagram of a container pick-and-place method provided according to an embodiment. As shown in FIG. 20, the target container (that is, the container shown in FIG. 20) that needs to be stored is located on the pick-and-place mechanism, and the pick-and-place mechanism is in the first position, and there is a preset height difference between the pick-and-place mechanism and the target storage position. The pick-and-place mechanism moves the container from the pick-and-place mechanism to the target storage position. When the front end of the container reaches the preset position corresponding to the target storage position, the transfer robot controls the pick-and-place mechanism to be lowered from the first position to the second position (and FIG. 20 shows an example where the height of the second position is the same as that of the target storage position), and the transfer robot continues to control the pick-and-place mechanism to move the container from the pick-and-place mechanism to the target storage position until the container completely enters the target storage position, indicating that the container storage task is completed.

Figure 21:
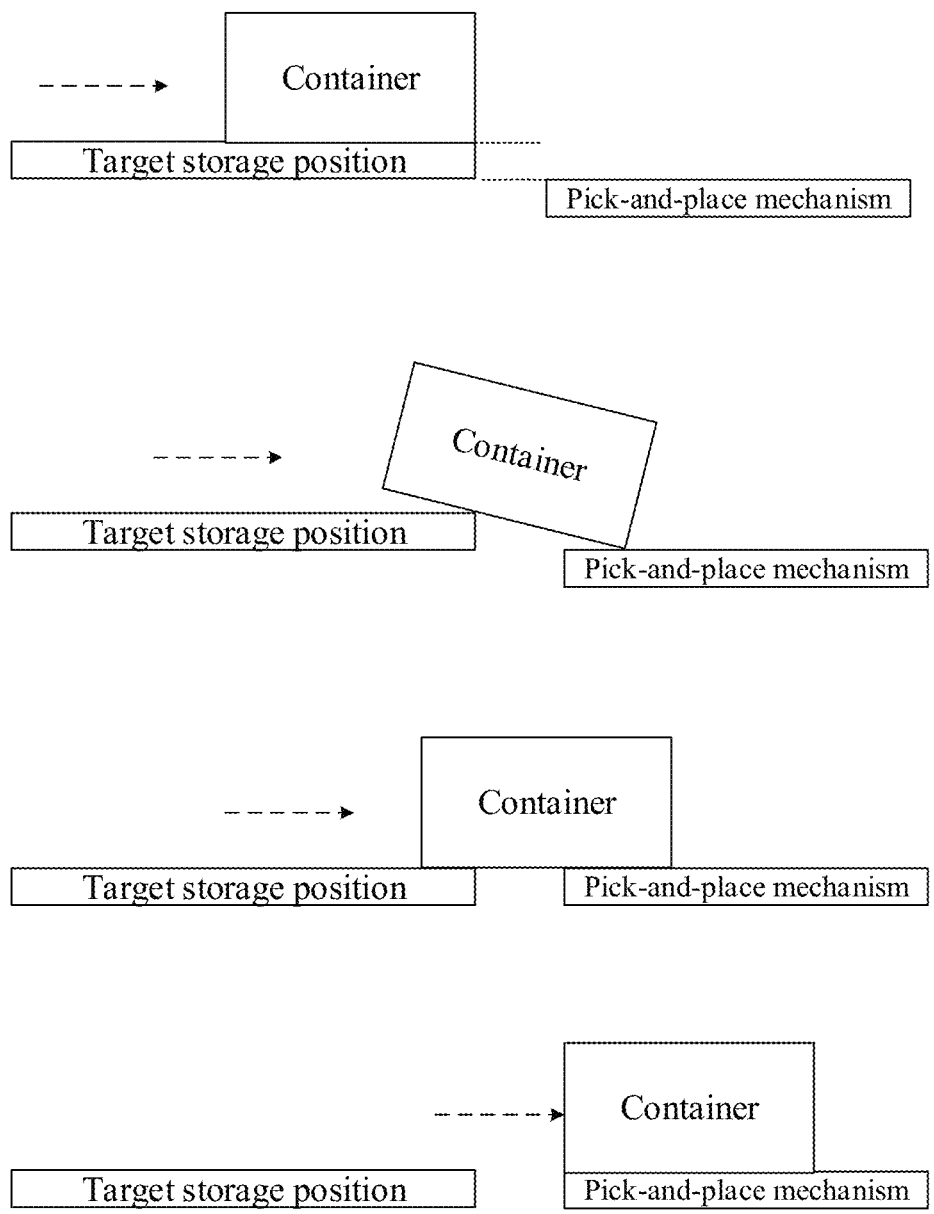
FIG. 21 is a schematic scene processing diagram of another container pick-and-place method provided by an embodiment of the present application.

The container pick-and-place method in an embodiment will be explained with reference to FIG. 21, which shows a schematic scene processing diagram of another container pick-and-place method provided according to an embodiment. As shown in FIG. 21, the target container (that is, the container shown in FIG. 21) that needs to be taken out is located at the target storage position, and the pick-and-place mechanism is located at the first position, and there is a preset height difference between the pick-and-place mechanism and the target storage position. The pick-and-place mechanism carries out moving the container from the target storage position to the pick-and-place mechanism. When the front end of the container reaches the preset position corresponding to the pick-and-place mechanism, the transfer robot controls the pick-and-place mechanism to ascend from the first position to the second position (and FIG. 21 shows an example where the height of the second position is the same as that of the target storage position), and the transfer robot continues to control the pick-and-place mechanism to move the container from the target storage position to the pick-and-place mechanism until the container completely enters the pick-and-and-place mechanism, indicating that the task of taking out the container is completed.

Figure 22:
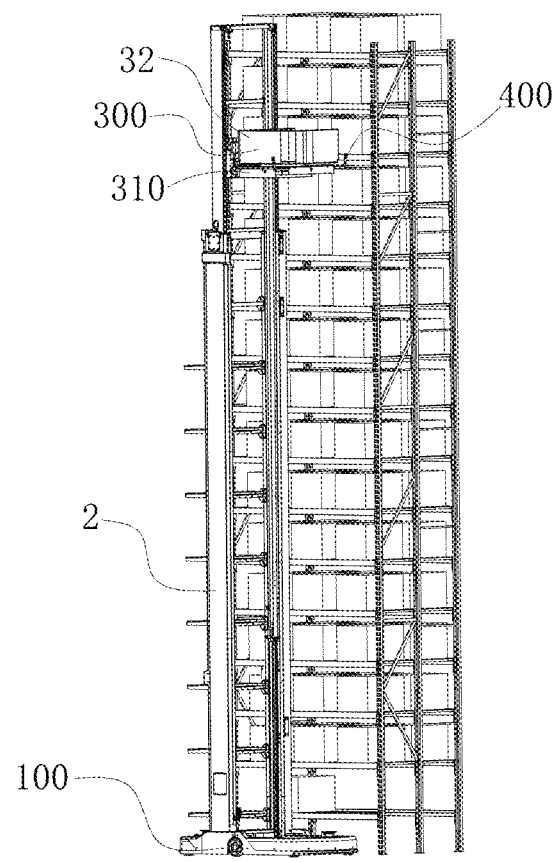
FIG. 22 is a schematic structural diagram of a transfer robot provided by an embodiment of the present application.

In an embodiment, refer to FIG. 22, which shows the structural schematic diagram of a transfer robot provided according to an embodiment of the present application. As shown in FIG. 22, the transfer robot includes a chassis assembly (100), a gantry assembly (2), a pick-and-place assembly (300) and an auxiliary support device (400), and the gantry assembly (2) is arranged on the chassis assembly (100). The pick-and-place assembly (300) includes a base (310) and a pick-and-place mechanism (32), and the base (31) is configured to drive the pick-and-place mechanism (32) to ascend or descend along the gantry assembly (2); and the auxiliary support device (400) is arranged on the base (310) and is configured to move between a first position and a second position; and the pick-and-place assembly (300) is configured to move to different height positions along the height direction in the process of picking and placing a single container, and the auxiliary support device (400) is configured to ascend or descend along with the pick-and-place assembly (300) along the gantry assembly (2).

The container pick-and-place method provided by the application is applied to a transfer robot, and the transfer robot includes a pick-and-place mechanism and an image acquisition apparatus, and the method includes the following steps. The transfer robot determines a target container in response to a container pick-and-place instruction, and moves to a target storage position corresponding to the target container; the pick-and-place mechanism is controlled to move to a first position, and start to pick and place the target container at the first position, and there is a preset height difference between the first position and the target storage position; an image of the target container is acquired based on an image acquisition apparatus, and the current position of the target container is determined according to the image acquisition result; and when the current position is at a preset position, the pick-and-place mechanism is adjusted to a second position, and the pick-and-place mechanism is controlled to pick and place the target container at the second position until completing picking and placing the container, and there is a target height difference between the second position and the target storage position, and the target height difference is smaller than the preset height difference.

An embodiment of the application can detect the position of the container in real time during the process of moving the container from a high position to a low position, so as to adjust the height of the pick-and-place mechanism according to the position of the container and reduce the height difference between the pick-and-place mechanism and the target storage position, thereby reducing the vibration caused by the collision of the container with the carrier of the container due to the height difference between the pick-and-place mechanism and the target storage position.

Figure 23:
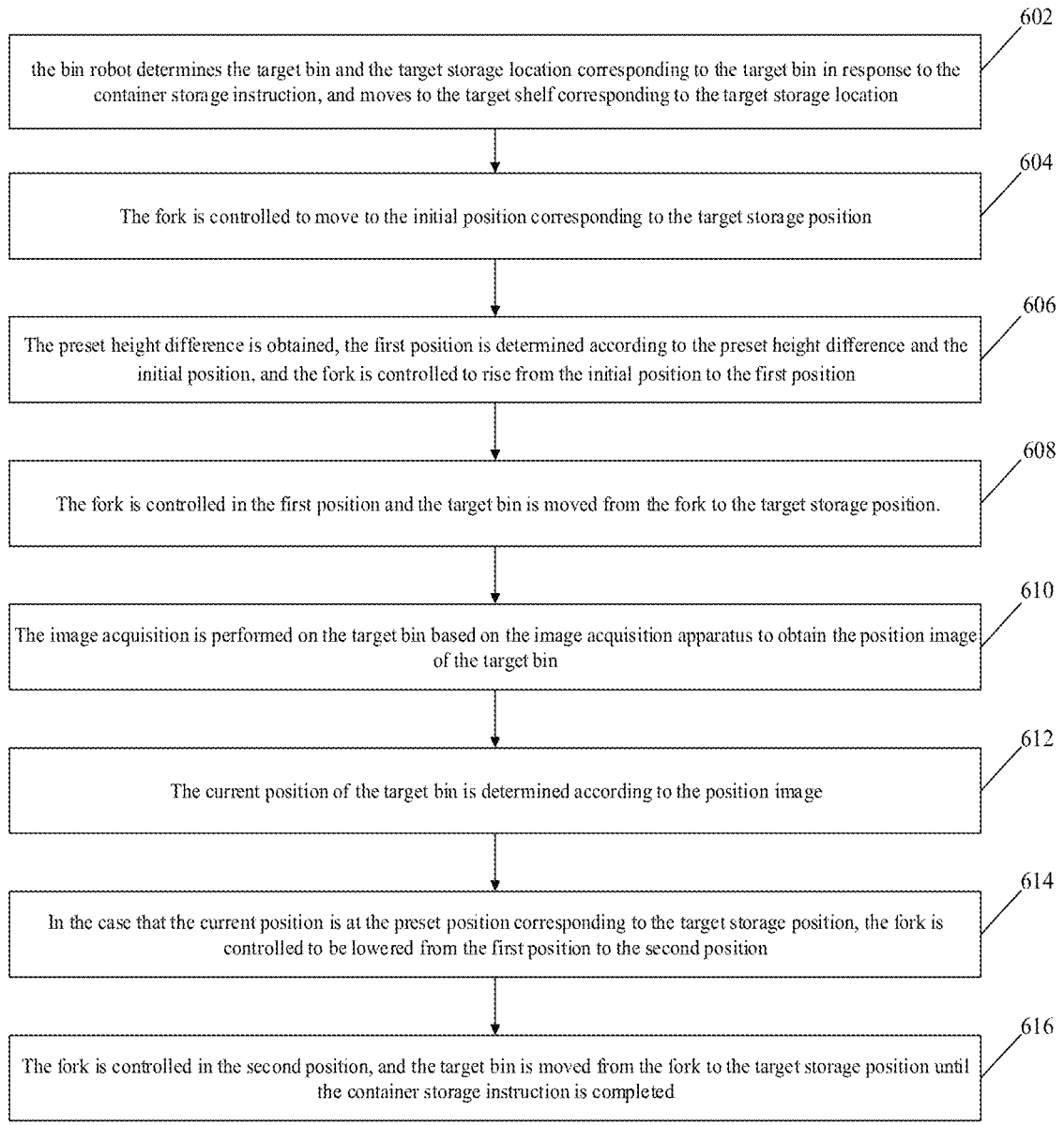
FIG. 23 is a processing flow chart of a container pick-and-place method applied to a warehouse scene provided by an embodiment of the present application.

With reference to FIG. 23, the container pick-and-place method is explained taking the application of the container pick-and-place method in an embodiment in a warehouse scene as an example. FIG. 23 shows a processing flow chart of a container pick-and-place method applied to the warehouse scene provided by an embodiment of the present application, which, in an embodiment, includes the following steps.

At step 602, the bin robot determines the target bin and the target storage position corresponding to the target bin in response to the container storage instruction, and moves to the target shelf corresponding to the target storage position.

At step 604, the fork is controlled to move to the initial position corresponding to the target storage position.

At step 606, the preset height difference is obtained, the first position is determined according to the preset height difference and the initial position, and the fork is controlled to ascend from the initial position to the first position.

At step 608, the fork is controlled in the first position and the target bin is moved from the fork to the target storage position.

At step 610, the image acquisition is performed on the target bin based on the image acquisition apparatus to obtain the position image of the target bin.

At step 612, the current position of the target bin is determined according to the position image.

At step 614, in the case that the current position is at the preset position corresponding to the target storage position, the fork is controlled to be lowered from the first position to the second position.

At step 616, the fork is controlled in the second position, and the target bin is moved from the fork to the target storage position until completing storing the container.

An embodiment of the application can detect the position of the bin in real time during the process of moving the bin from the high position to the low position, so as to adjust the height of the fork according to the position of the bin and reduce the height difference between the fork and the target storage position, thereby reducing the vibration caused by the collision of the bin with the shelf due to the height difference between the fork and the target storage position.

Figure 24:
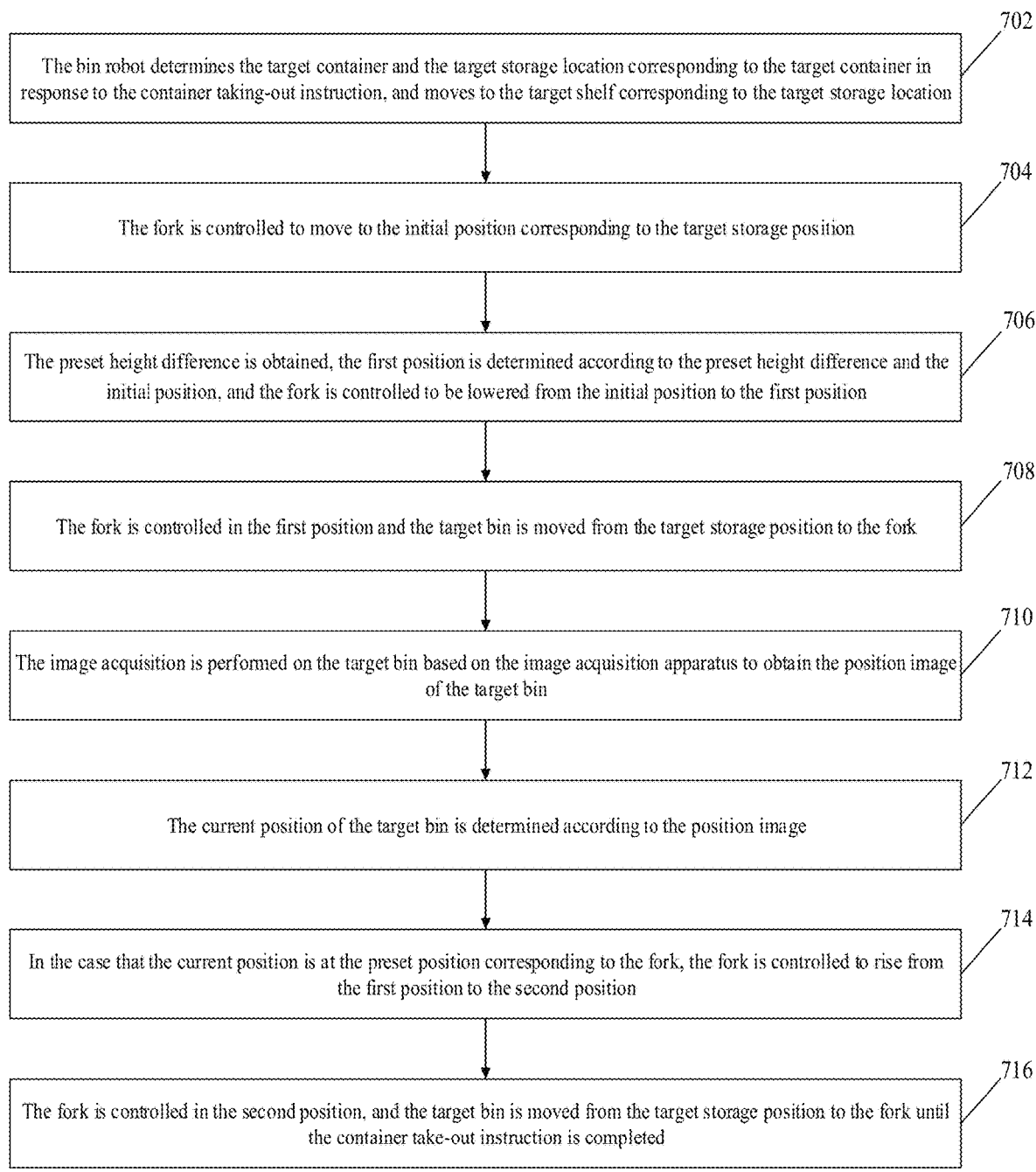
FIG. 24 is a processing flow chart of another container pick-and-place method applied to a warehouse scene provided by an embodiment of the present application.

With reference to FIG. 24, the container pick-and-place method is explained taking the application of the container pick-and-place method provided in an embodiment in a warehouse scene as an example. FIG. 24 shows a processing flow chart of another container pick-and-place method applied to the warehouse scene provided by an embodiment of the present application, which in an embodiment includes the following steps.

At step 702, the bin robot determines the target container and the target storage position corresponding to the target container in response to the container taking-out instruction, and moves to the target shelf corresponding to the target storage position.

At step 704, the fork is controlled to move to the initial position corresponding to the target storage position.

At step 706, the preset height difference is obtained, the first position is determined according to the preset height difference and the initial position, and the fork is controlled to be lowered from the initial position to the first position.

At step 708, the fork is controlled in the first position and the target bin is moved from the target storage position to the fork.

At step 710, the image acquisition is performed on the target bin based on the image acquisition apparatus to obtain the position image of the target bin.

At step 712, the current position of the target bin is determined according to the position image.

At step 714, in the case that the current position is at the preset position corresponding to the fork, the fork is controlled to ascend from the first position to the second position.

At step 716, the fork is controlled in the second position, and the target bin is moved from the target storage position to the fork until completing taking out the container.

An embodiment of the application can detect the position of the bin in real time during the process of moving the bin from the high position to the low position, so as to adjust the height of the fork according to the position of the bin and reduce the height difference between the fork and the target storage position, thereby reducing the vibration caused by the collision of the bin with the shelf due to the height difference between the fork and the target storage position.

Figure 25:
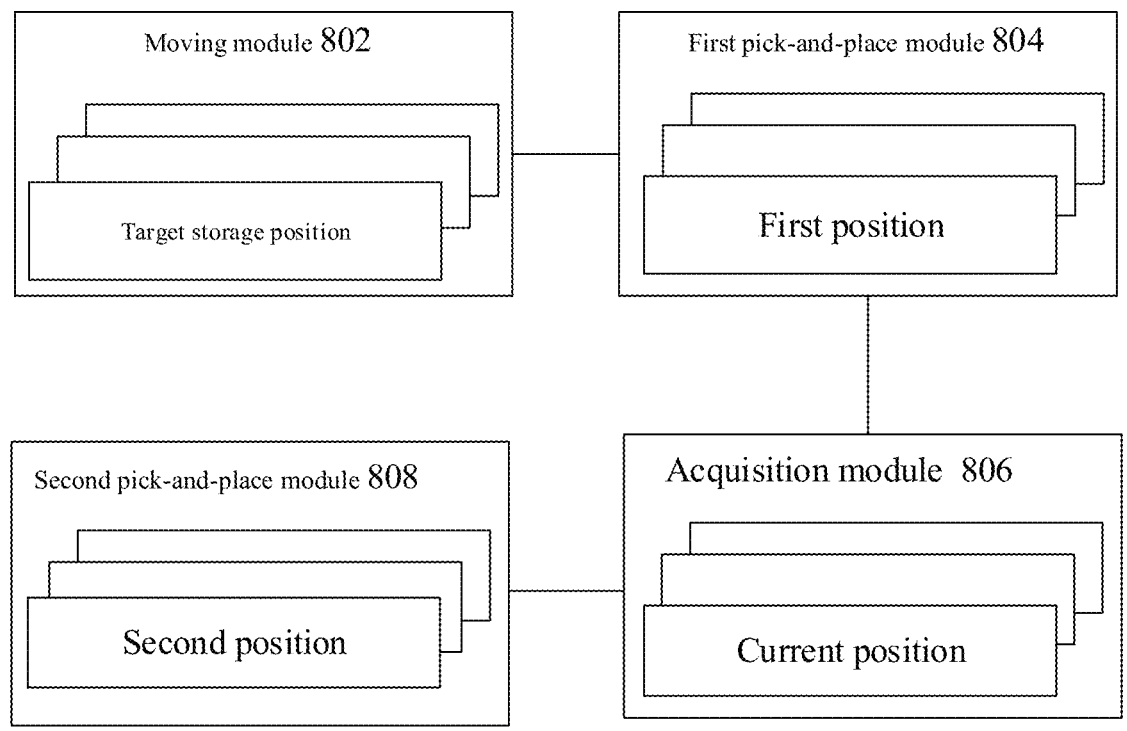
FIG. 25 is a schematic structural diagram of a container pick-and-place device provided by an embodiment of the present application.

Corresponding to the above embodiments of method, the application also provides an embodiment of a container pick-and-place device, and FIG. 25 shows the structural schematic diagram of a container pick-and-place device provided by an embodiment of the application. As shown in FIG. 25, the device is applied to a transfer robot, and the transfer robot includes a pick-and-place mechanism and an image acquisition apparatus, and the device includes a moving module 802 configured for the transfer robot to determine a target container in response to a container pick-and-place instruction, and move to a target storage position corresponding to the target container; a first pick-and-place module 804 configured to control the pick-and-place mechanism to move to a first position, and start to pick and place the target container at the first position, and there is a preset height difference between the first position and the target storage position; an acquisition module 806 configured to acquire an image of the target container based on an image acquisition apparatus and determine the current position of the target container according to the image acquisition result; a second pick-and-place module 808 configured to adjust the pick-and-place mechanism to a second position in the case that the current position is at a preset position, and control the pick-and-place mechanism to pick and place the target container at the second position until completing picking and placing the container, and there is a target height difference between the second position and the target storage position, and the target height difference is smaller than the preset height difference.

In an embodiment, the moving module 802 is configured as follows.

The transfer robot determines a target container and a target storage position corresponding to the target container in response to a container pick-and-place instruction, and moves to a carrier of the target container corresponding to the target storage position; and the pick-and-place mechanism is controlled to move to the initial position corresponding to the target storage position.

In an embodiment, the container pick-and-place instruction includes a container storage instruction.

The first pick-and-place module 804 is configured to obtain a preset height difference; determine a first position according to the preset height difference and the initial position, and control the pick-and-place mechanism to ascend from the initial position to the first position.

In an embodiment, the first pick-and-place module 804 is configured to control the pick-and-place mechanism in the first position, and move the target container from the pick-and-place mechanism to the target storage position.

In an embodiment, in the case that the container pick-and-place instruction includes a container storing instruction, the preset position is the preset position corresponding to the target storage position; and the second pick-and-place module 808 is configured to: control the pick-and-place mechanism to be lowered from the first position to a second position in the case that the current position is at a preset position corresponding to the target storage position; and control the pick-and-place mechanism in the second position, and move the target container from the pick-and-place mechanism to the target storage position.

In an embodiment, the second pick-and-place module 808 is configured to: move the target container from the pick-and-place mechanism to the target storage position in the process of lowering the pick-and-place mechanism from the first position to the second position; or moving the target container from the pick-and-place mechanism to the target storage position after the pick-and-place mechanism is lowered from the first position to the second position.

In an embodiment, the container pick-and-place instruction includes a container take-out instruction; and the first pick-and-place module 804 is configured to: obtain a preset height difference; and determine a first position according to the preset height difference and the initial position, and control the pick-and-place mechanism to be lowered from the initial position to the first position.

In an embodiment, the first pick-and-place module 804 is configured to: control the pick-and-place mechanism in the first position, and move the target container from the target storage position to the pick-and-place mechanism.

In an embodiment, in the case that the container pick-and-place instruction includes a container taking-out instruction, the preset position is a preset position corresponding to the pick-and-place mechanism; and the second pick-and-place module 808 is configured to: control the pick-and-place mechanism to ascend from the first position to a second position under the condition that the current position is located at a preset position corresponding to the pick-and-place mechanism; and control the pick-and-place mechanism in the second position, and move the target container from the target storage position to the pick-and-place mechanism.

In an embodiment, the second pick-and-place module 808 is configured to: move the target container from the target storage position to the pick-and-place mechanism during the lifting of the pick-and-place mechanism from the first position to the second position; or move the target container from the target storage position to the pick-and-place mechanism after the pick-and-place mechanism is raised from the first position to the second position.

In an embodiment, the acquisition module 806 is configured to: perform the image acquisition of the target container based on an image acquisition apparatus to obtain a position image of the target container; and determine the current position of the target container according to the position image.

The container fetching device provided by the application is applied to a transfer robot, and the transfer robot includes a pick-and-place mechanism and an image acquisition apparatus, and the device includes a moving module which is configured for the transfer robot to determine a target container in response to a container pick-and-place instruction, and move to a target storage position corresponding to the target container; a first pick-and-place module configured to control the pick-and-place mechanism to move to a first position, and start to pick and place the target container at the first position, wherein there is a preset height difference between the first position and the target storage position; an acquisition module configured to perform the image acquisition of the target container based on an image acquisition apparatus and determine the current position of the target container according to an image acquisition result; a second pick-and-place module configured to adjust the pick-and-place mechanism to a second position when the current position is at a preset position, and control the pick-and-place mechanism to pick and place the target container at the second position until completing picking and placing the container, wherein there is a target height difference between the second position and the target storage position, and the target height difference is smaller than the preset height difference.

An embodiment of the application can detect the position of the container in real time during the process of moving the container from a high position to a low position, so as to adjust the height of the pick-and-place mechanism according to the position of the container and reduce the height difference between the pick-and-place mechanism and the target storage position, thereby reducing the vibration caused by the collision of the container with the carrier of the container due to the height difference between the pick-and-place mechanism and the target storage position.

The above description is a schematic solution of a container pick-and-place device in an embodiment. The technical solution of the container pick-and-place device belongs to the same concept as that of the above-mentioned container pick-and-place method. For details not described in detail in the technical solution of the container pick-and-place device, please refer to the description of the technical solution of the above-mentioned container pick-and-place method.

Figure 26:
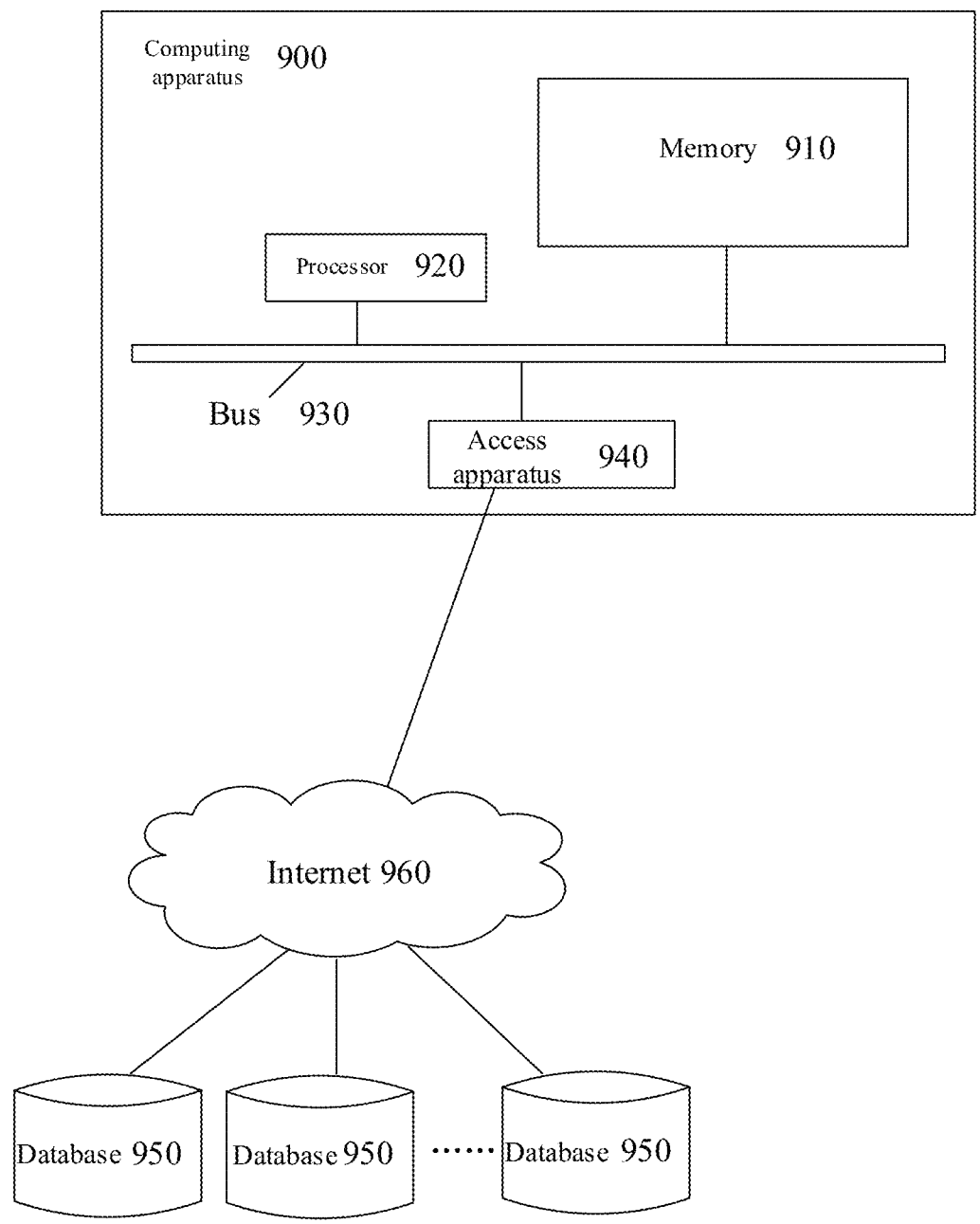
FIG. 26 is a structural block diagram of a computing apparatus provided by an embodiment of the present application.

FIG. 26 shows a structural block diagram of a computing apparatus 900 provided according to an embodiment of the present application. Components of the computing apparatus 900 include, but are not limited to, a memory 910 and a processor 920. The processor 920 is connected with the memory 910 through the bus 930, and a database 950 is used to store data.

The computing apparatus 900 also includes an access apparatus 940 that enables the computing apparatus 900 to communicate via one or more networks 960. Examples of these networks include a public switched telephone network (PSTN), a local area network (LAN), a wide area network (WAN), a personal area network (PAN) or a combination of communication networks such as the Internet. The access apparatus 940 may include one or more of any type of wired or wireless network interfaces (for example, one or more in a network interface controller (NIC)), such as an IEEE802.11 wireless local area network (WLAN) wireless interface, a worldwide interoperability for microwave access (Wi-MAX) interface, an Ethernet interface, a universal serial bus (USB) interface, a cellular network interface, a Bluetooth interface, a near field communication (NFC) interface, and so on.

In an embodiment of the present application, the above components of the computing apparatus 900 and other components not shown in FIG. 26 may also be connected to each other, for example, through a bus. The block diagram of the computing apparatus shown in FIG. 26 is only for the purpose of example, and is not a limitation on the scope of the application. Those skilled in the art can add or replace other components as needed.

The computing apparatus 900 can be any type of static or mobile computing apparatus, including a mobile computer or a mobile computing apparatus (e.g., a tablet computer, a personal digital assistant, a laptop computer, a notebook computer, a netbook, etc.), a mobile phone (e.g., a smart phone), a wearable computing apparatus (e.g., a smart watch, a smart glass, etc.) or other types of apparatus, or the static computing apparatus such as a desktop computer or a personal computer (PC). The computing apparatus 900 may also be a mobile or stationary server.

The steps of the container pick-and-place method is realized when the processor 920 executes the computer instructions.

The above description is a schematic solution of a computing apparatus in an embodiment. The technical solution of the computing apparatus belongs to the same concept as the technical solution of the above-mentioned container pick-and-place method, and details not described in detail in the technical solution of the computing apparatus can be referred to the description of the technical solution of the above-mentioned container pick-and-place method.

An embodiment of the application also provides a computer-readable storage medium, which stores computer instructions, and when the computer instructions are executed by a processor, the steps of the container pick-and-place method as described above are realized.

The above description is a schematic solution of a computer-readable storage medium in an embodiment. The technical solution of the storage medium belongs to the same concept as the technical solution of the above-mentioned container pick-and-place method. For details not described in detail in the technical solution of the storage medium, please refer to the description of the technical solution of the above-mentioned container pick-and-place method.

Embodiments of the present application have been described above. Other embodiments are within the scope of the appended claims. In some cases, the actions or steps recited in the claims may be performed in a different order than in the embodiments and still achieve the desired results. In addition, the processes depicted in the drawings do not necessarily require the specific order shown or the sequential order to achieve the desired results. In some embodiments, multitasking and parallel processing are also possible or may be advantageous.

The computer instructions include computer program code, which can be in a source-code form, an object-code form, an executable-file form or some intermediate forms, etc. The computer-readable medium may include any entity or device capable of carrying the computer program code, a recording medium, a U disk, a mobile hard disk, a magnetic disk, an optical disk, a computer memory, a read-only memory (ROM), a random access memory (RAM), an electric carrier signal, a telecommunication signal, a software distribution medium, etc.

A transfer robot is provided in the present application, including:
  a chassis assembly;
  a lifting device arranged on the chassis assembly;
  a pick-and-place assembly arranged on the lifting device, wherein the lifting device is configured to drive the lifting of the pick-and-place assembly; and
  an auxiliary support device connected to the pick-and-place assembly, including a driving assembly, a transmission assembly and a support assembly, wherein the driving assembly is connected to the support assembly through the transmission assembly to drive the support assembly to extend in a first direction relative to the pick-and-place assembly until the support assembly abuts against or separates from carriers at two sides of the transfer robot.

In some embodiments, the lifting device includes a gantry assembly, the pick-and-place assembly includes a base and a pick-and-place mechanism rotatably connected to the base, and the base is configured to drive the pick-and-place mechanism to ascend or descend along the gantry assembly.

In some embodiments, the auxiliary support device is arranged on the base and is configured to move between an extended position and a retracted position, wherein in the extended position, the auxiliary support device extends until abutting against the carriers; and in the retracted position, the auxiliary support device is retracted relative to the carriers.

In some embodiments, the auxiliary support device includes a first support mechanism configured to extend in the first direction and a second support mechanism configured to extend in an opposite direction to the first direction; and the first support mechanism and the second support mechanism are independently controlled and are symmetrically distributed on the base.

In some embodiments, the first support mechanism includes a first support assembly, and the second support mechanism includes a second support assembly; and the support assembly includes the first support assembly and the second support assembly, and the first support assembly and the second support assembly are respectively arranged corresponding to two opposite ends of the pick-and-place assembly and are respectively configured to abut against the carriers at two sides of the transfer robot.

In some embodiments, the transfer robot includes a distance sensor, and the driving assembly is configured to control the first support mechanism and the second support mechanism to extend a same displacement or different displacements to two opposite sides respectively based on detected distances between the auxiliary support device and the carriers and a width of a roadway.

In some embodiments, wherein the transfer robot is configured to, when the detected distances between the transfer robot and the carriers in the first direction are greater than or less than a threshold, compensate the displacements extended by the first support mechanism and the second support mechanism based on differences between the detected distances and the threshold.

In some embodiments, wherein the support assembly includes a support portion and an abutting portion connected to the support portion.

In some embodiments, wherein the support portion includes a first main body portion and a second main body portion, and the abutting portion includes a first support portion and a second support portion; and the first support assembly includes the first main body portion and the first support portion, and the second support assembly includes the second main body portion and the second support portion.

In some embodiments, wherein the transmission assembly is arranged along the first direction and the driving assembly is arranged along a second direction, and the first direction is perpendicular to the second direction.

In some embodiments, wherein the first support mechanism includes a first driving assembly and a first transmission assembly, and the second support mechanism includes a second driving assembly and a second transmission assembly; the driving assembly includes the first driving assembly and the second driving assembly, and the transmission assembly includes the first driving assembly and the second driving assembly; and the transmission assembly is arranged along the first direction, the driving assembly is arranged along a second direction, and the first direction is perpendicular to the second direction;

the first driving assembly is connected with the first support assembly through the first transmission assembly, and the second driving assembly is connected with the second support assembly through the second transmission assembly;

the first driving assembly and the second driving assembly are both arranged along the second direction, and are sequentially arranged along the first direction; and the first transmission assembly and the second transmission assembly are both arranged along the first direction, and are sequentially arranged along the second direction.

In some embodiments, the first transmission assembly and the second transmission assembly both include a driving wheel, a transmission wheel and a traction transmission component, the first driving assembly or the second driving assembly is connected with the driving wheel, the driving wheel and the transmission wheel are sequentially arranged at intervals along the first direction, and the traction transmission component is wound around the driving wheel and the transmission wheel; and the traction transmission component includes a first part and a second part, wherein the first part and the second part are both located between the driving wheel and the transmission wheel, the first part and the second part are respectively located at two radial ends of the driving wheel, and one of the first part and the second part is connected with the first support assembly or the second support assembly.

In some embodiments, the auxiliary support device includes a first guide rail and a second guide rail, and both of the first guide rail and the second guide rail extend along the first direction; and the first support assembly is slidably arranged on the first guide rail through a first slider, and the second support assembly is slidably arranged on the second guide rail through a second slider.

In some embodiments, both the first main body portion and the second main body portion extend along the first direction, the first support portion is arranged at a first end of the first main body portion, the second support portion is arranged at a second end of the second main body portion, and the first end and the second end are two opposite ends; and the first main body portion is connected with the first driving assembly, the second main body portion is connected with the second driving assembly, and the first support portion and the second support portion are respectively configured to abut against the carriers at two sides of the transfer robot.

In some embodiments, the first support portion is hinged with the first main body portion, and the first support portion has a folded posture where the first support portion is parallel to the first main body portion and an unfolded posture where the first support portion is perpendicular to the first main body portion; and the first support assembly includes a third driving assembly, and the third driving assembly is arranged on the first main body portion and connected with the first support portion, and is configured to drive the first support portion to rotate relative to the first main body portion, so that the first support portion is switched between the folded posture and the unfolded posture.

In some embodiments, the second support portion is hinged to the second main body portion, and the second support portion has a folded posture where the second support portion is parallel to the second main body portion and an unfolded posture where the second support portion is perpendicular to the second main body portion; and the second support assembly includes a fourth driving assembly, and the fourth driving assembly is arranged on the second main body portion and connected with the second support portion, and is configured to drive the second support portion to rotate relative to the second main body portion, so that the second support portion is switched between the folded posture and the unfolded posture.

In some embodiments, the third driving assembly and the fourth driving assembly are both elastic driving pieces, and the elastic driving piece has a tendency to maintain the first support portion or the second support portion in the unfolded posture.

In some embodiments, two ends of the pick-and-place assembly corresponding to the first support portion and the second support portion are respectively provided with stop-reset pieces; and when the first support assembly and the second support assembly are retracted, the stop-reset piece acts on the corresponding first support portion or second support portion, so that the first support portion or the second support portion is in the folded posture.

In some embodiments, the pick-and-place mechanism includes a telescopic fork assembly, and the telescopic fork assembly is arranged above the base; and the auxiliary support device is connected below the base.

In some embodiments, the auxiliary support device is arranged on the base at a position deviating from an axis of the pick-and-place mechanism, and when in the retracted position, the auxiliary support device is configured to be located outside a rotation area of the pick-and-place mechanism.

In some embodiments, when in the extended position, the support portion is configured to extend outwards relative to the base until the abutting portion abuts against the carriers; and when in the retracted position, the support portion is configured to be retracted until the abutting portion moves to a position adjacent to the base; and when in the retracted position, the abutting portion is configured to be located outside the rotation area of the pick-and-place mechanism.

In some embodiments, the support portion is arranged on the base at a position lower than the pick-and-place mechanism, and the abutting portion is configured to extend upwards from the support portion to partially overlap with the pick-and-place mechanism in a height direction.

In some embodiments, the pick-and-place mechanism includes a bearing portion for bearing a container, the auxiliary support device is arranged on the base at a position corresponding to outside of a side wall of the bearing portion and is configured to extend in the first direction, and the bearing portion is configured to be rotated at least to face the first direction so as to pick and place the container located in the first direction.

In some embodiments, when an opening of the pick-and-place mechanism faces the first direction, orthographic projections of side walls of the abutting portion and the bearing portion in the first direction do not overlap or at least partially overlap.

In some embodiments, an avoidance structure is arranged at an edge of the bearing portion facing the abutting portion.

In some embodiments, a side of the base adjacent to the gantry assembly is connected to the gantry assembly through a lifting mechanism; and the auxiliary support device is arranged on a side of the base away from the gantry assembly.

In some embodiments, the auxiliary support device includes a movement mechanism configured to drive the support portion to move between the extended position and the retracted position; and the movement mechanism includes a motor arranged on the base and the transmission assembly driven by the motor, and the support portion is guidably fitted on the base and is connected to the transmission assembly through a connecting portion; and the transmission assembly is configured to drive the support portion to move between the extended position and the retracted position.

In some embodiments, when the auxiliary support device is located in the extended position and ascends or descends with the pick-and-place assembly along the gantry assembly, an abutting portion in the auxiliary support device is configured to be movably fitted with the carriers.

In some embodiments, a part of the abutting portion in contact with the carriers adopts a self-lubricating material.

In some embodiments, the self-lubricating material includes nylon, Polyoxymethylene (POM), Polyamide (PA), Polybutylene Terephthalate (PBT), Polycarbonate (PC), carbon fiber, Polytetrafluoroethylene (PTFE), Polyphenylene Sulfide (PPS), graphite and silicone.

In some embodiments, the abutting portion includes a fixed portion and a sliding portion, and the sliding portion is slidably connected to the fixed portion; when in the extended position, the sliding portion abuts against the carriers; and when the pick-and-place assembly drives the auxiliary support device to ascend or descend along the gantry assembly, the sliding portion is configured to slide relative to the fixed portion.

In some embodiments, the abutting portion includes a bracket and a rolling portion rotatably connected to the bracket, and when in the extended position, the rolling portion is configured to abut against the carriers, and be in a rolling fit with the carriers in the process of moving.

In some embodiments, the pick-and-place mechanism includes a bearing portion for bearing a container and a pick-and-place member for picking and placing the container, and the transfer robot is configured to, when taking the container, control the pick-and-place assembly to move in a height direction until the bearing portion is lower than a first height position where a bearing surface storing the container is located, and control the pick-and-place assembly to move upwards to a second height position after the pick-and-place member takes the container on the bearing surface to a first predetermined position, so that the pick-and-place member completely takes the container to the bearing portion, wherein when the pick-and-place assembly moves between the first height position and the second height position, the support assembly for auxiliary supporting is configured to remain in the extended position.

In some embodiments, the pick-and-place assembly is configured to simultaneously take the container from the first predetermined position to the bearing portion in the process of ascending from the first height position to the second height position; or, the pick-and-place assembly is configured to take the container from the first predetermined position to the bearing portion after ascending from the first height position to the second height position.

In some embodiments, when in the second height position, the bearing portion is lower than the bearing surface, and a height difference between the bearing portion and the bearing surface is smaller than a height difference between the bearing portion and the bearing surface when in the first height position; or, when in the second height position, the bearing portion is flush with the bearing surface or higher than the bearing surface.

In some embodiments, when the container is located in the first predetermined position, an edge of a side of the container adjacent to the pick-and-place assembly is configured to be beyond an edge of the bearing portion at least by a predetermined distance.

In some embodiments, when the container is located in the first predetermined position, the edge of the side of the container adjacent to the pick-and-place assembly is configured not to be on the bearing portion, or an edge of a side of the container away from the pick-and-place assembly is configured not to be on the bearing portion.

In some embodiments, the pick-and-place mechanism includes a bearing portion for bearing a container and a pick-and-place member for picking and placing the container, and the transfer robot is configured to, when returning the container, control the pick-and-place assembly to move in a height direction until the bearing portion is higher than a third height position where a target bearing surface is located, and control the pick-and-place assembly to move downwards to a fourth height position after the pick-and-place member takes the container on the bearing portion to a second predetermined position, so that the pick-and-place member completely returns the container to the bearing surface, wherein during the movement of the pick-and-place assembly between the third height position and the fourth height position, the support assembly for auxiliary supporting is configured to remain in the extended position.

In some embodiments, the pick-and-place assembly is configured to, in the process of descending from the third height position to the fourth height position, simultaneously return the container from the second predetermined position to the bearing surface; or, the pick-and-place assembly is configured to, after descending from the third height position to the fourth height position, return the container from the second predetermined position to the bearing surface.

In some embodiments, when in the fourth height position, the bearing portion is higher than the bearing surface, and a height difference between the bearing portion and the bearing surface is less than a height difference between the bearing portion and the bearing surface when in the third height position; or, when in the fourth height position, the bearing portion is flush with or lower than the bearing surface.

In some embodiments, when the container is located in the second predetermined position, an edge of a side of the container adjacent to the bearing surface is configured to be beyond an edge of the bearing surface at least by a predetermined distance.

In some embodiments, when the container is located in the second predetermined position, the edge of the side of the container adjacent to the bearing surface is configured not to be on the bearing surface, or an edge of a side of the container away from the bearing surface is configured not to be on the bearing surface.

Another transfer robot is also provided, including:
a chassis assembly;
a gantry assembly arranged on the chassis assembly;

a pick-and-place assembly configured to ascend or descend along the gantry assembly to pick and place containers at different heights; and an auxiliary support device arranged on the pick-and-place assembly and configured to extend outwards until abutting against a carrier, wherein the pick-and-place assembly is configured to move to different height positions along a height direction in the process of picking and placing a single container, and the auxiliary support device is configured to abut against and be movably fitted with the carrier in the process that the auxiliary support device ascends or descends with the pick-and-place assembly along the gantry assembly.

For the sake of simple description, all the above embodiments of the method are expressed as a series of action combinations, but those skilled in the art should know that this specification is not limited by the described action sequence, because some steps can be performed in other sequences or at the same time according to the specification. Secondly, those skilled in the art should also know that the embodiments described in the specification are all preferred embodiments, and the actions and modules involved are not necessarily necessary in this specification.

In the above-mentioned embodiments, the description of each embodiment has its own emphasis. For the parts not detailed in one embodiment, please refer to the relevant descriptions of other embodiments.

The preferred embodiments in the specification disclosed above are only used to help explain the specification. Optional embodiments do not describe all the details, nor are they limited the present disclosure to the specific embodiments described. Obviously, many modifications and changes can be made according to the contents of the specification. These embodiments are selected and described in detail in this specification in order to better explain the principle and practical application of the specification, so that those skilled in the technical field can better understand and make use of the specification. The specification is limited only by the claims and the full scope thereof and its equivalents.

What is claimed is:

1. A container pick-and-place method, applied to a container pick-and-place apparatus, wherein the container pick-and-place apparatus comprises a pick-and-place component and an image acquisition apparatus, and the method comprises:
    determining a target container in response to a container pick-and-place instruction, and moving the container pick-and-place apparatus to a target storage position corresponding to the target container;
    controlling the pick-and-place component to move to a first position, and starting to pick and place the target container in the first position, wherein the first position has a preset height difference with respect to the target storage position;
    moving the target container from a high position to a low position; and
    performing an image acquisition of the target container by the image acquisition apparatus in while moving the target container from the high position to the low position, and determining a current position of the target container according to a result of the image acquisition; and
    in response to the current position of the target container reaching a preset position, adjusting the pick-and-place component to a second position, and controlling the pick-and-place component to pick and place the target container in the second position until completing picking and placing the target container, wherein the second position has a target height difference with respect to the target storage position and the target height difference is less than the preset height difference.

2. The method according to claim 1, wherein the determining by the container pick-and-place apparatus the target container in response to the container pick-and-place instruction and moving by the container pick-and-place apparatus to the target storage position corresponding to the target container comprises:
    moving the container pick-and-place apparatus to a carrier for the target container corresponding to the target storage position; and
    controlling the pick-and-place component to move to an initial position corresponding to the target storage position.

3. The method according to claim 2, wherein the container pick-and-place instruction comprises a container take-out instruction, and controlling the pick-and-place component to move to the first position comprises:
    obtaining the preset height difference; and
    determining the first position of the pick-and-place component according to the preset height difference and the initial position of the target storage position, and controlling the pick-and-place component to descend from the initial position to the first position.

4. The method according to claim 2, wherein the container pick-and-place instruction comprises a container storing instruction, and controlling the pick-and-place component to move to the first position comprises:
    obtaining the preset height difference; and
    determining the first position according to the preset height difference and the initial position, and controlling the pick-and-place component to ascend from the initial position to the first position.

5. The method according to claim 1, wherein picking and placing the target container the target container in the first position comprising:
    controlling the pick-and-place component to move the target container from the target storage position onto the pick-and-place component in the first position.

6. The method according to claim 5, wherein in a case that the container pick-and-place instruction comprises a container take-out instruction, the preset position is a preset position corresponding to the pick-and-place component, and
    in response to the current position of the pick-and-place component reaching the preset position, adjusting the pick-and-place component to the second position and controlling the pick-and-place component to pick and place the target container in the second position comprises:
    controlling the pick-and-place component to ascend from the first position to the second position in response to the current position of the pick-and-place component reaching the preset position; and
    controlling the pick-and-place component to move the target container from the target storage position to the pick-and-place component in the second position.

7. The method according to claim 6, wherein controlling the pick-and-place component to move the target container from the target storage position to the pick-and-place component in the second position comprises:

moving the target container from the target storage position to the pick-and-place component while the pick-and-place component ascends from the first position to the second position; or moving the target container from the target storage position to the pick-and-place component after the pick-and-place component ascends from the first position to the second position.

8. The method according to claim 6, wherein the pick-and-place component comprises a bearing portion for bearing a container and a pick-and-place member for picking and placing the container, and the container pick-and-place apparatus is configured to, when picking the container, control the pick-and-place component to move in a height direction of the container pick-and-place apparatus until the bearing portion is lower than a first height position where a bearing surface storing the container is located, and control the pick-and-place component to move upwards to a second height position after the pick-and-place member takes the container on the bearing surface to a first predetermined position, so that the pick-and-place member completely takes the container to the bearing portion, wherein the first height position is the first position and the second height position is the second position.

9. The method according to claim 8, wherein when in the second height position, the bearing portion is lower than the bearing surface, and a height difference between the bearing portion and the bearing surface is smaller than a height difference between the bearing portion and the bearing surface when in the first height position; or, when in the second height position, the bearing portion is flush with the bearing surface or higher than the bearing surface.

10. The method according to claim 9, wherein when the container is located in the first predetermined position, and an edge of a side of the container adjacent to the pick-and-place component is configured to be beyond an edge of the bearing portion at least by a predetermined distance.

11. The method according to claim 10, wherein when the container is located in the first predetermined position, the edge of the side of the container adjacent to the pick-and-place component is configured not to be on the bearing portion, or, an edge of a side of the container away from the pick-and-place component is configured not to be on the bearing portion.

12. The method according to claim 1, wherein picking and placing the target container in the first position comprises:
controlling the pick-and-place component to move the target container from the pick-and-place component to the target storage position in the first position.

13. The method according to claim 12, wherein the container pick-and-place instruction comprises a container storing instruction, and the preset position is a preset position corresponding to the target storage position, and in response to the current position of the container reaching the preset position, adjusting the pick-and-place component to the second position and controlling the pick-and-place component to pick and place the target container in the second position comprises:
controlling the pick-and-place component descend from the first position to the second position in a case that the current position is the preset position corresponding to the target storage position; and
controlling the pick-and-place component to move the target container from the pick-and-place component to the target storage position in the second position.

14. The method according to claim 13, wherein controlling the pick-and-place component to move the target container from the pick-and-place component to the target storage position in the second position comprises:
moving the target container from the pick-and-place component to the target storage position while the pick-and-place component descends from the first position to the second position; or
moving the target container from the pick-and-place component to the target storage position after the pick-and-place component descends from the first position to the second position.

15. The method according to claim 13, wherein the pick-and-place component comprises a bearing portion for bearing a container and a pick-and-place member for picking and placing the container, and
the container pick-and-place apparatus is configured to, when returning the container to the target storage position:
move in a height direction until the bearing portion is higher than a third height position where a target bearing surface is located, and
move downwards to a fourth height position after the pick-and-place member places the container on the bearing portion to a second predetermined position, so that the pick-and-place member completely returns the container to the target bearing surface, wherein the third height position is the first position and the fourth height position is the second position.

16. The method according to claim 15, wherein in response to the pick-and-place component being in the fourth height position:
the bearing portion is higher than the target bearing surface, and a height difference between the bearing portion and the target bearing surface is smaller than a height difference between the bearing portion and the target bearing surface when in the third height position; or,
the bearing portion is flush with or lower than the target bearing surface.

17. The method according to claim 16, wherein when the container is located in the second predetermined position:
an edge of a side of the container adjacent to the target bearing surface is configured to be beyond an edge of the target bearing surface at least by a predetermined distance; and
the edge of the side of the container adjacent to the target bearing surface is configured not to be on the target bearing surface, or an edge of a side of the container away from the target bearing surface is configured not to be on the target bearing surface.

18. The method according to claim 1, wherein performing the image acquisition on the target container based on the image acquisition apparatus and determining the current position of the target container according to the result of the image acquisition comprises:
performing the image acquisition on the target container based on the image acquisition apparatus to obtain a position image of the target container; and
determining the current position of the target container according to the position image.

19. A computing apparatus, comprising a memory, a processor and a computer instruction stored in the memory and executable on the processor, wherein when the processor executes the computer instruction, steps of a method are realized, and method is applied to a container pick-and-place apparatus, wherein the container pick-and-place apparatus comprises a pick-and-place component and an image acquisition apparatus, and the method comprises:

determining a target container in response to a container pick-and-place instruction, and moving the container pick-and-place apparatus to a target storage position corresponding to the target container;

controlling the pick-and-place component to move to a first position, and starting to pick and place the target container in the first position, wherein the first position has a preset height difference with respect to the target storage position;

moving the target container from a high position to a low position; and performing an image acquisition of the target container by the image acquisition apparatus while moving the target container from the high position to the low position, and determining a current position of the target container according to a result of the image acquisition; and in response to the current position of the target container reaching a preset position, adjusting the pick-and-place component to a second position, and controlling the pick-and-place component to pick and place the target container in the second position until completing picking and placing the target container, wherein the second position has a target height difference with respect to the target storage position and the target height difference is less than the preset height difference.

20. A non-transitory computer-readable storage medium, on which a computer instruction is stored, wherein when the computer instruction is executed by a processor, steps of a method are realized, and the method is applied to a container pick-and-place apparatus, wherein the container pick-and-place apparatus comprises a pick-and-place component and an image acquisition apparatus, and the method comprises:

determining a target container in response to a container pick-and-place instruction, and moving the container pick-and-place apparatus to a target storage position corresponding to the target container;

controlling the pick-and-place component to move to a first position, and starting to pick and place the target container in the first position, wherein the first position has a preset height difference with respect to the target storage position;

moving the target container from a high position to a low position; and performing an image acquisition of the target container by the image acquisition apparatus while moving the target container from the high position to the low position, and determining a current position of the target container according to a result of the image acquisition; and in response to the current position of the target container reaching a preset position, adjusting the pick-and-place component to a second position, and controlling the pick-and-place component to pick and place the target container in the second position until completing picking and placing the target container, wherein the second position has a target height difference with respect to the target storage position and the target height difference is less than the preset height difference.

* * * * *